United States Patent
Ishioka

(10) Patent No.: US 11,167,753 B2
(45) Date of Patent: Nov. 9, 2021

(54) VEHICLE CONTROL DEVICE, VEHICLE CONTROL METHOD, AND VEHICLE CONTROL PROGRAM

(71) Applicant: HONDA MOTOR CO., LTD., Tokyo (JP)

(72) Inventor: Atsushi Ishioka, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 200 days.

(21) Appl. No.: 16/473,673

(22) PCT Filed: Jan. 11, 2017

(86) PCT No.: PCT/JP2017/000619
§ 371 (c)(1),
(2) Date: Jun. 26, 2019

(87) PCT Pub. No.: WO2018/131090
PCT Pub. Date: Jul. 19, 2018

(65) Prior Publication Data
US 2019/0329766 A1    Oct. 31, 2019

(51) Int. Cl.
*B60W 30/09* (2012.01)
*B60W 30/095* (2012.01)
*B60W 50/00* (2006.01)

(52) U.S. Cl.
CPC ........ *B60W 30/09* (2013.01); *B60W 30/0953* (2013.01); *B60W 30/0956* (2013.01);
(Continued)

(58) Field of Classification Search
CPC .................................................. B60W 30/09
See application file for complete search history.

(56) References Cited

U.S. PATENT DOCUMENTS

| 9,542,849 B1 | 1/2017 | Bertram et al. |
| 2013/0131925 A1* | 5/2013 | Isaji ...................... B60W 30/16 701/41 |

(Continued)

FOREIGN PATENT DOCUMENTS

| JP | 06-255514 | 9/1994 |
| JP | 2004-078333 | 3/2004 |

(Continued)

OTHER PUBLICATIONS

International Search Report and Written Opinion for International Application No. PCT/JP2017/000619 dated Mar. 21, 2017, 11 pgs.

*Primary Examiner* — Alex C Dunn
(74) *Attorney, Agent, or Firm* — Amin, Turocy & Watson, LLP

(57) ABSTRACT

A vehicle control device includes a detector configured to detect a surrounding object of a host vehicle, a generator configured to generate a first target trajectory on the basis of a shape of a traveling path in which the host vehicle travels, a first potential calculator configured to calculate a guiding potential which represents safety of traveling along the first target trajectory, a second potential calculator configured to calculate a surrounding potential which represents safety based on a surrounding object of the host vehicle, a third potential calculator configured to calculate a traveling potential, which represents safety when the host vehicle is moved in a direction intersecting a traveling direction of the host vehicle at each point included in an area in which the host vehicle will be traveling in the future based on the first target trajectory, on the basis of the guiding potential and the surrounding potential, and a traveling controller configured to perform traveling control of the host vehicle on the basis of a second target trajectory obtained by modifying the first target trajectory on the basis of the traveling potential.

10 Claims, 19 Drawing Sheets

(52) U.S. Cl.
CPC ..... *B60W 50/0098* (2013.01); *B60W 2420/42* (2013.01); *B60W 2420/52* (2013.01); *B60W 2554/00* (2020.02); *B60W 2554/80* (2020.02)

(56) References Cited

U.S. PATENT DOCUMENTS

| | | | |
|---|---|---|---|
| 2014/0067206 A1 | 3/2014 | Pflug | |
| 2015/0210311 A1* | 7/2015 | Maurer | B62D 6/00 701/41 |
| 2015/0344030 A1* | 12/2015 | Damerow | B60W 30/0956 701/1 |
| 2016/0059855 A1 | 3/2016 | Rebhan et al. | |
| 2016/0272199 A1* | 9/2016 | Kawahara | B60W 30/08 |
| 2018/0284803 A1* | 10/2018 | Lee | G05D 1/024 |
| 2019/0100199 A1* | 4/2019 | Ueda | G05D 1/0212 |
| 2020/0074863 A1* | 3/2020 | Jung | G01S 17/86 |
| 2020/0180638 A1* | 6/2020 | Kanoh | B60W 30/18163 |
| 2020/0241541 A1* | 7/2020 | McCawley | G05D 1/0217 |
| 2020/0369267 A1* | 11/2020 | Iwamura | B62D 15/025 |

FOREIGN PATENT DOCUMENTS

| | | |
|---|---|---|
| JP | 2015-110403 | 6/2015 |
| JP | 2015-228204 | 12/2015 |
| JP | 2016-008024 | 1/2016 |

\* cited by examiner

VEHICLE CONTROL DEVICE, VEHICLE CONTROL METHOD, AND VEHICLE CONTROL PROGRAM

TECHNICAL FIELD

The present invention relates to a vehicle control device, a vehicle control method, and a storage medium.

BACKGROUND ART

In recent years, research on automated driving which automatically performs acceleration or deceleration and steering has progressed. With regard to this, a technology which performs automated steering on the basis of a traveling trajectory route of a preceding vehicle when a probability of encountering an obstacle becomes high while remaining traveling along a predetermined route as far as possible has been disclosed (for example, refer to Patent Literature 1).

CITATION LIST

Patent Literature

[Patent Literature 1]
Japanese Unexamined Patent Application, First Publication No. 2004-78333

SUMMARY OF INVENTION

Technical Problem

However, in the technology disclosed in Patent Literature 1, automated steering which is appropriate when there are no preceding vehicles may not be realized. A sense of insecurity given to an occupant of a vehicle according to the presence of an obstacle in the vicinity of the host vehicle may increase.

The present invention has been made in consideration of such circumstances, and an object thereof is to provide a vehicle control device, a vehicle control method, and a vehicle control program which can suppress the sense of insecurity given to the occupant of a vehicle according to a situation in the vicinity of the host vehicle.

Solution to Problem (1): A vehicle control device which includes a detector configured to detect a surrounding object of a host vehicle, a generator configured to generate a first target trajectory on the basis of a shape of a traveling path in which the host vehicle travels, a first potential calculator configured to calculate an guiding potential which represents safety of traveling along the first target trajectory, a second potential calculator configured to calculate a surrounding potential which represents safety based on a surrounding object of the host vehicle, a third potential calculator configured to calculate a traveling potential, which represents safety when the host vehicle is moved in a direction intersecting a traveling direction of the host vehicle at each point included in an area in which the host vehicle will be traveling in the future based on the first target trajectory, on the basis of an guiding potential calculated by the first potential calculator and a surrounding potential calculated by the second potential calculator, and a traveling controller configured to perform traveling control of the host vehicle on the basis of a second target trajectory obtained by modifying the first target trajectory on the basis of a traveling potential calculated by the third potential calculator.

(2): The vehicle control device according to (1), wherein the first potential calculator calculates an guiding potential on the basis of a position of a side wall provided in the traveling path and a position of a white line drawn in the traveling path.

(3): The vehicle control device according to (1), in which the first potential calculator sets an guiding potential at a point corresponding to the first target trajectory to a highest safety value, and calculates an guiding potential of a value indicating that the safety has gradually decreased from the value indicating that the safety is the highest as a point becomes further away from the point at which the guiding potential of a value indicating that the safety is the highest is set.

(4): The vehicle control device according to (1), in which the surrounding object includes a position of an obstacle in a vicinity of the host vehicle and a position of a white line drawn in the traveling path, and the second potential calculator calculates a surrounding potential representing a safety based on the position of an obstacle and the position of a white line.

(5): The vehicle control device according to (1), wherein the second potential calculator calculates an guiding potential of a value indicating that the safety has gradually decreased from a value indicating that the safety is the highest as a point becomes further away from the point at which the guiding potential of a value indicating that the safety is the highest is set.

(6): The vehicle control device according to (1), wherein the second potential calculator changes a surrounding potential at a point corresponding to a vicinity of an object other than a white line among the surrounding objects to a value indicating that the safety has sharply decreased from the highest safety value.

(7): The vehicle control device according to (1), in which the second potential calculator predicts a future acceleration or deceleration speed of the host vehicle and an acceleration or deceleration speed of another vehicle in the vicinity of the host vehicle, and calculates the surrounding potential corresponding to a point in which the host vehicle will be traveling in the future on the basis of a relative position between the host vehicle and the another vehicle based on the predicted future acceleration or deceleration speed of the host vehicle and the predicted acceleration or deceleration speed of another vehicle in the vicinity of the host vehicle.

(8): The vehicle control device according to (1), in which the second potential calculator changes a gradient that changes a surrounding potential at a point corresponding to a vicinity of the surrounding object on the basis of at least one of a condition designated by an occupant of the host vehicle, a type of the surrounding object, or a traveling history of the host vehicle.

(9): The vehicle control device according to (1), which further includes a surrounding object acquirer configured to acquire position information of a surrounding object present in a blind area of the detector in an area in which the host vehicle travels, and in which the second potential calculator calculates a surrounding potential on the basis of the position information of a surrounding object acquired by the surrounding object acquirer.

(10): A vehicle control method which includes, using a computer, acquiring a situation outside a vehicle, detecting a surrounding object of a host vehicle, generating a first target trajectory on the basis of a shape of a traveling path in which the host vehicle travels, calculating an guiding potential which represents safety of traveling along the first target trajectory, calculating a surrounding potential which represents safety based on a surrounding object of the host vehicle, calculating a traveling potential, which represents safety when the host vehicle is moved in a direction intersecting a traveling direction of the host vehicle at each point included in an area in which the host vehicle will be traveling in the future based on the first target trajectory, on the basis of the surrounding potential, and performing traveling control of the host vehicle on the basis of a second target trajectory obtained by modifying the first target trajectory on the basis of the traveling potential.

(11): A computer-readable non-transitory storage medium storing a vehicle control program which causes a computer to acquire a situation outside a vehicle, detect a surrounding object of a host vehicle, generate a first target trajectory on the basis of a shape of a traveling path in which the host vehicle travels, calculate an guiding potential which represents safety of traveling along the first target trajectory, calculate a surrounding potential which represents safety based on a surrounding object of the host vehicle, calculate a traveling potential, which represents safety when the host vehicle is moved in a direction intersecting a traveling direction of the host vehicle at each point included in an area in which the host vehicle will be traveling in the future based on the first target trajectory, on the basis of the surrounding potential, and perform traveling control of the host vehicle on the basis of a second target trajectory obtained by modifying the first target trajectory on the basis of the traveling potential.

Advantageous Effects of Invention

According to (1), (10), and (11) described above, since the position of the vehicle M in the width direction W can be adjusted on the basis of a surrounding potential in addition to an guiding potential, it is possible to suppress the sense of insecurity given to the occupant of the vehicle according to a situation in the vicinity of the host vehicle.

According to (2) described above, since an guiding potential is calculated on the basis of the position of a side wall provided in the traveling path and the position of a white line drawn in the traveling path, it is possible to move the position of the host vehicle in the width direction on the basis of the positions of a side wall and a white line.

According to (3) described above, since an guiding potential which has gradually decreased from the highest safety value as a point becomes further away from the point at which the guiding potential having the highest safety value is set is calculated, it is possible to perform control such that the host vehicle returns to the traveling path L when the host vehicle travels outside the traveling path from a white line.

According to (4) described above, since a surrounding potential which represents safety based on the position of an obstacle and the position of a white line, it is possible to suppress the sense of insecurity given to the occupant of the vehicle according to the situations of a white line and a side wall.

According to (5) and (6) described above, it is possible to suppress the sense of insecurity given to the occupant of the vehicle according to the situations of a side wall and the like except a white line.

According to (7) described above, since the future acceleration or deceleration speed of a vehicle and the acceleration or deceleration speed of another vehicle in the vicinity of the vehicle are predicted, and a surrounding potential corresponding to a point which a vehicle will be traveling in the future is calculated on the basis of a result of the prediction, it is possible to suppress the sense of insecurity given to the occupant of the vehicle according to the situation of the another vehicle.

According to (8) described above, it is possible to control the traveling of a vehicle by considering a condition designated by the occupant of the vehicle, a type of a surrounding object, or a traveling history of the vehicle.

According to (9) described above, it is possible to suppress the sense of insecurity given to the occupant of a vehicle according to a surrounding object present in a blind area.

DESCRIPTION OF EMBODIMENTS

Hereinafter, embodiments of a vehicle control device, a vehicle control method, and a vehicle control program of the present invention will be described with reference to the drawings.

[Vehicle Configuration]

Figure 1:
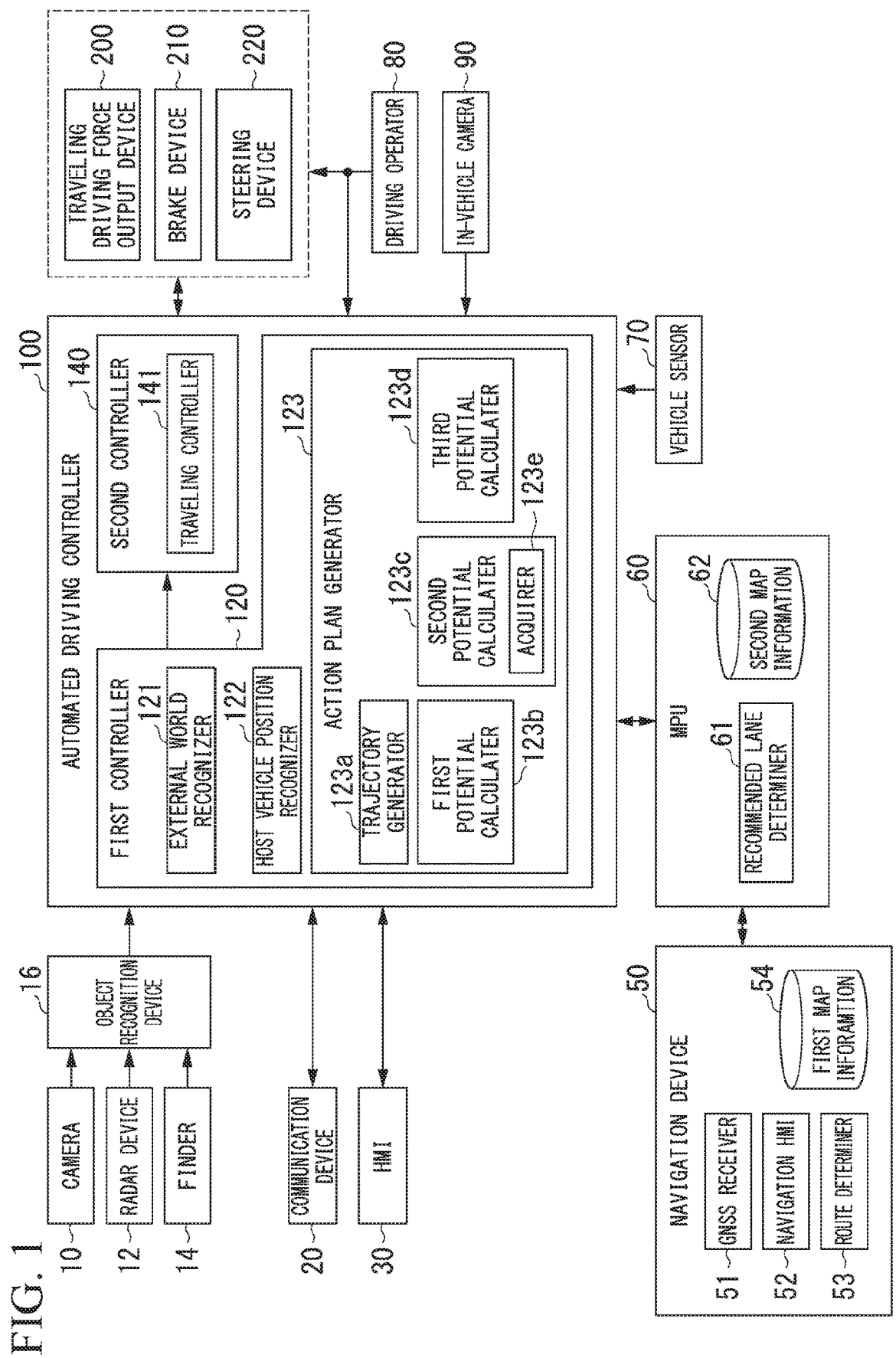
FIG. 1 is a diagram which shows an example of constituents mounted on a vehicle M.

First, constituents mounted on a vehicle M will be described. FIG. 1 is a diagram which shows examples of constituents mounted on the vehicle M. For example, a camera 10, a radar device 12, a finder 14, an object recognition device 16, a communication device 20, a human machine interface (HMI) 30, a navigation device 50, a micro-processing unit (MPU) 60, a vehicle sensor 70, a driving operator 80, an in-vehicle camera 90, an automated driving controller 100, a traveling driving force output device 200, a brake device 210, and a steering device 220 are mounted on the vehicle M. These devices and apparatuses are connected to each other by a multiplex communication line such as a controller area network (CAN) communication line, a serial communication line, a wireless communication line, or the like. Note that the constituents shown in FIG. 1 are merely examples, a part of the constituents may be omitted, and furthermore, another constituent may also be added. An example of a "vehicle control device" includes at least the camera 10, the radar device 12, the finder 14, the first controller 120, and the second controller 140 among the constituents shown in FIG. 1.

The camera 10 is, for example, a digital camera which uses a solid-state imaging device such as a charge coupled device (CCD) or a complementary metal oxide semiconductor (CMOS). One or more of the cameras 10 are attached to any points of the vehicle M. When the front is imaged, the camera 10 is attached to a top of the front windshield, a rear of the rearview mirror, or the like. The camera 10 images, for example, surroundings of the vehicle M periodically and repeatedly. The camera 10 may also be a stereo camera.

The radar device 12 emits radio waves such as millimeter waves around the vehicle M, and detects radio waves (reflected waves) reflected by an object to detect at least a position (a distance and a direction) of the object. One or more of the radar devices 12 are attached to any points of the vehicle M. The radar device 12 may also detect the position and speed of the object according to a frequency modulated continuous wave (FM-CW) method.

The finder 14 is light detection and ranging or laser imaging detection and ranging (LIDAR) which measures scattered light with respect to the emitted light and detects a distance to an object. One or more of the finders 14 are attached to any points of the vehicle M.

The object recognition device 16 performs sensor fusion processing on results of detection by some or all of the camera 10, the radar device 12, and the finder 14, and recognizes a position, a type, a speed, and the like of the object. The object recognition device 16 outputs a result of the recognition to the automated driving controller 100.

The communication device 20 communicates with another vehicle present in the vicinity of the vehicle M using, for example, a cellular network, a Wi-Fi network, a Bluetooth (registered trademark), a dedicated short range communication (DSRC), or the like, or communicates with an external device such as a remote operation management facility 300 or the like via a wireless base station.

The HMI 30 presents various types of information to an occupant of the vehicle M, and receives an input operation by the occupant. The HMI 30 includes various display devices, a speaker, a buzzer, a touch panel, a switch, a key, and the like.

The navigation device 50 includes, for example, a global navigation satellite system (GNSS) receiver 51, a navigation HMI 52, and a route determiner 53, and holds first map information 54 in a storage device such as a hard disk drive (HDD) or a flash memory. The GNSS receiver identifies the position of the vehicle M on the basis of a signal received from a GNSS satellite. The position of the vehicle M may be identified or complemented by an inertial navigation system (INS) using an output of the vehicle sensor 70. The navigation HMI 52 includes a display device, a speaker, a touch panel, a key, and the like. The navigation HMI 52 may be partially or entirely shared with the HMI 30 described above. The route determiner 53 refers to the first map information 54 and determines a route to a destination input by the occupant using the navigation HMI 52 on the basis of the position (or any input position) of the vehicle M identified by the GNSS receiver 51. The first map information 54 is information in which a road shape is represented by a link indicating a road and a node connected by the link. The first map information 54 may also include road curvature, a point of interest (POI) information, and the like. A route determined by the route determiner 53 is output to the MPU 60. In addition, the navigation device 50 may perform route guidance using the navigation HMI 52 on the basis of the route determined by the route determiner 53. Note that the navigation device 50 may be realized, for example, by a function of a terminal device such as a smartphone or a tablet terminal owned by a user. In addition, the navigation device 50 may transmit a current position and a destination to a navigation server via the communication device 20, and acquire a route returned from the navigation server.

The MPU 60 functions as, for example, a recommended lane determiner 61, and holds second map information 62 in the storage device such as an HDD or a flash memory. The recommended lane determiner 61 divides the route provided by the navigation device 50 into a plurality of blocks (for example, divides every 100 [m] in a vehicle traveling direction), and determines a recommended lane for each block with reference to the second map information 62. The recommended lane determiner 61 determines which number$^{th}$ lane from the left to travel. The recommended lane determiner 61 determines a recommended lane such that the vehicle M can travel a reasonable route to travel to a branch destination when a branch point, a confluence point, and the like are present in the route.

The second map information 62 is map information with higher accuracy than that of the first map information 54. The second map information 62 includes, for example, information on a center of a lane, information on a boundary of a lane, or the like. In addition, the second map information 62 may include road information, traffic regulation information, address information (address and zip code), facility information, telephone number information, and the like. The road information includes information indicating a type of road such as an express way, a toll road, a national road, and a prefectural road, and information indicating the number of lanes of a road, a width of each lane, a slope of a road, a position (three-dimensional coordinates including longitude, latitude, and height) of a road, curvature of a curve of a lane, positions of confluence and branch points of a lane, signs provided on a road, and the like. The second map information 62 may be updated at any time by accessing another device using the communication device 20.

The vehicle sensor 70 includes a vehicle speed sensor that detects a speed of the vehicle M, an acceleration sensor that detects acceleration, a yaw rate sensor that detects an angular speed around the vertical axis, an orientation sensor that detects a direction of the vehicle M, and the like.

The driving operator 80 includes, for example, an accelerator pedal, a brake pedal, a shift lever, a steering wheel, and other operators. The driving operator 80 includes a sensor which detects an amount of operation or a presence or absence of operation, and a result of the detection is output to the automated driving controller 100 or one or both of the traveling driving force output device 200, the brake device 210, and the steering device 220. The driving operator 80 includes a touch sensor which detects a presence or absence of a contact with the driving operator 80 in addition to a sensor that detects the presence or absence of operation. The touch sensor is, for example, a sensor embedded in a grip portion of the steering wheel. The touch sensor detects that a hand of a vehicle occupant touches the steering wheel, and outputs a result of the detection to the automated driving controller 100.

The in-vehicle camera 90 captures an image of an upper body centered about a face of the occupant seated in a driver's seat. The captured image of the in-vehicle camera 90 is output to the automated driving controller 100.

The automated driving controller 100 includes, for example, a first controller 120, and a second controller 140. The first controller 120 and the second controller 140 are realized by a processor such as a central processing unit (CPU) executing a program (software), respectively. In addition, a part or all of the first controller 120 and the second controller 140 to be described below may be realized by hardware such as a large scale integration (LSI), an application specific integrated circuit (ASIC), or a field-programmable gate array (FPGA), and may be realized by a cooperation of software and hardware.

The first controller 120 includes, for example, an external world recognizer 121, a host vehicle position recognizer 122, and an action plan generator 123.

The external world recognizer 121 recognizes states of a position, a speed, and acceleration of a surrounding vehicle on the basis of information input from the camera 10, the radar device 12, and the finder 14 directly or via the object recognition device 16. The position of a surrounding vehicle may be represented by a representative point such as a center of gravity or a corner of the surrounding vehicle, and may also be represented by an area expressed by a contour of the surrounding vehicle. The "state" of a surrounding vehicle may include acceleration or jerk of the surrounding vehicle or the "behavior state" (for example, whether the surrounding vehicle is changing a lane or is intending to change a lane). In addition, the external world recognizer 121 may recognize positions of guardrails, poles, parking vehicles, pedestrians, and other objects in addition to surrounding vehicles.

The host vehicle position recognizer 122 recognizes a lane (a traveling lane) on which the vehicle M is traveling, and a relative position and a posture of the vehicle M with respect to the traveling lane. The host vehicle position recognizer 122 recognizes the traveling lane by comparing, for example, a pattern of road division lines (for example, an array of solid and broken lines) obtained from the second map information 62 and a pattern of road division lines in the vicinity of the vehicle M recognized from an image captured by the the camera 10. In this recognition, the position of the vehicle M acquired from the navigation device 50 and a result of processing by INS may be added.

Figure 2:
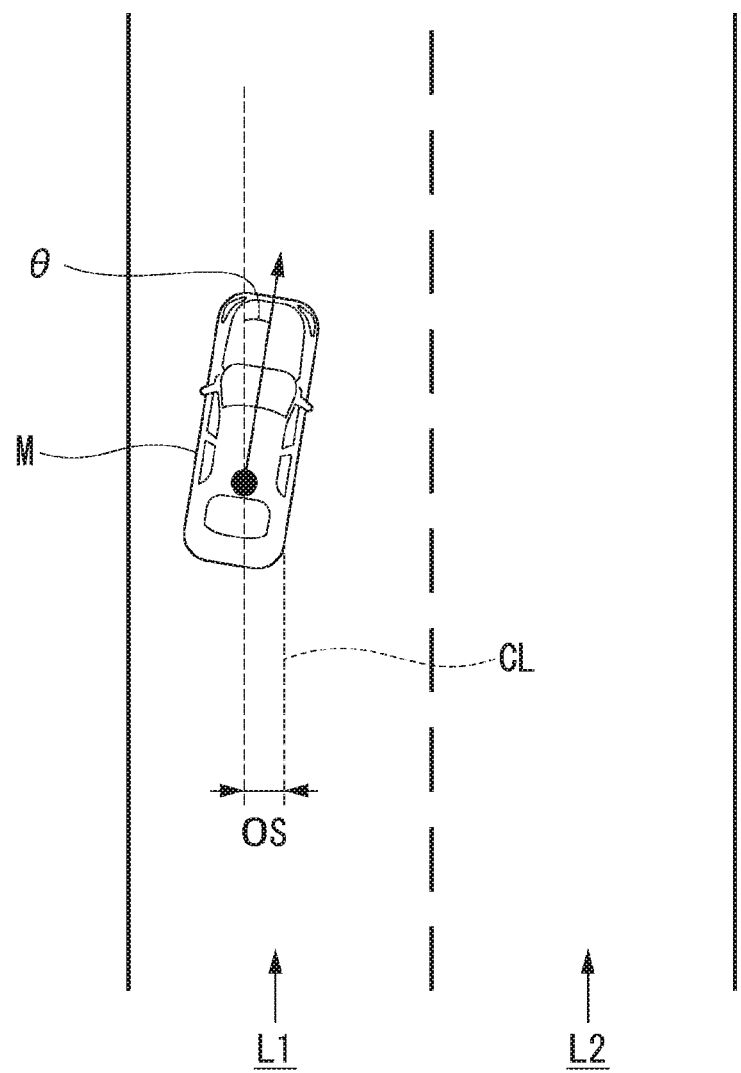
FIG. 2 is a diagram which shows how a relative position and a posture of a host vehicle M with respect to a traveling lane L1 are recognized by a host vehicle position recognizer.

The host vehicle position recognizer 122 recognizes, for example, the position or posture of the host vehicle M with respect to the traveling lane. FIG. 2 is a diagram which shows how the relative position and posture of the host vehicle M with respect to a traveling lane L1 are recognized by the host vehicle position recognizer 122. The host vehicle position recognizer 122 recognizes, for example, an angle θ formed with respect to a line connecting a deviation OS from a center CL of the traveling lane that is a reference point (for example, a center of gravity) of the host vehicle M and the center CL of the traveling lane of the host vehicle M in a traveling direction as the relative position and posture of the host vehicle M with respect to the traveling lane L1. Note that, instead of this, the host vehicle position recognizer 122 may recognize a position of the reference point of the host vehicle M with respect to any side end of the host lane L1 or the like as a relative position of the host vehicle M with respect to the traveling lane. The relative position of the host vehicle M recognized by the host vehicle position recognizer 122 is provided to the recommended lane determiner 61 and the action plan generator 123.

The action plan generator 123 determines an event to be sequentially executed in automated driving to travel a recommended lane determined by the recommended lane determiner 61 and to cope with a surrounding situation of the vehicle M. The event includes, for example, a constant speed traveling event for traveling the same traveling lane with a constant speed, a following traveling event for following a preceding vehicle, a lane change event, a confluence event, a branch event, an emergency stop event, a handover event for ending automated driving and switching it to manual driving, and the like. In addition, while these events are executed, an avoidance behavior may be planned on the basis of the surrounding situation of the vehicle M (surrounding vehicles, presence of pedestrians, lane constriction due to road construction, and the like).

The action plan generator 123 generates a target trajectory in which the host vehicle will be traveling in the future according to functions of the trajectory generator 123a, a first potential calculator 123b, a second potential calculator 123c, and a third potential calculator 123d. The target trajectory contains, for example, a speed element. For example, a plurality of future reference times are set for each predetermined sampling time (for example, about 0 decimal point [sec], and the target trajectory is generated as a set of target points (orbital points) to be reached at these reference times. For this reason, a case of a wide interval between orbital points indicates that the host vehicle M travels a section between these orbital points at a high speed. Note that detailed descriptions of the trajectory generator 123a, the first potential calculator 123b, the second potential calculator 123c, and the third potential calculator 123d will be described below.

Figure 3:
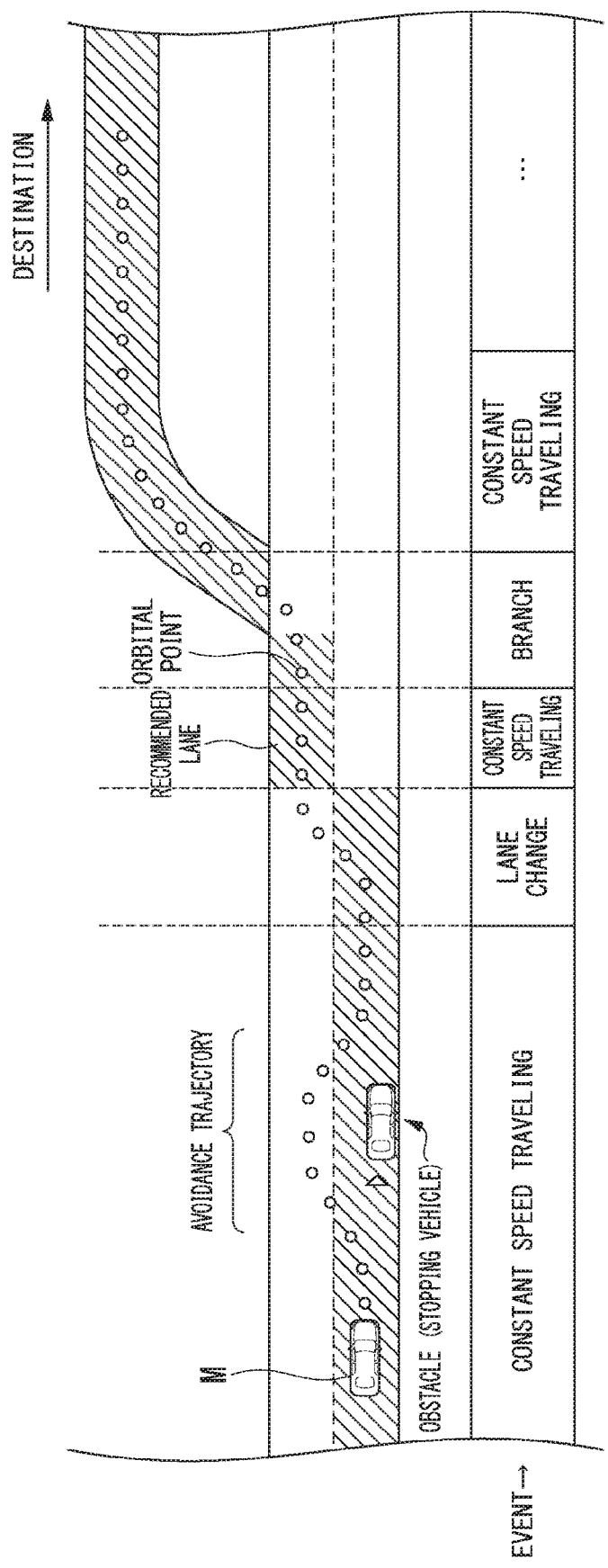
FIG. 3 is a diagram which shows how a target trajectory is generated on the basis of a recommended lane.

FIG. 3 is a diagram which shows how a target trajectory is generated on the basis of a recommended lane. As illustrated, a recommended lane is set to make traveling along the route to a destination convenient. The action plan generator 123 activates a lane change event, a branch event, a confluence event, or the like if the host vehicle M approaches a predetermined distance before a switching point of the recommended lane (may be determined according to a type of an event). When it is necessary to avoid an obstacle while each event is executed, an avoidance trajectory is generated as illustrated.

The action plan generator 123 generates, for example, a plurality of candidates for a target trajectory, and selects an optimal target trajectory at the time on the basis of a viewpoint of safety and efficiency.

The second controller 140 includes a traveling controller 141. The traveling controller 141 controls the traveling driving force output device 200, the brake device 210, and the steering device 220 such that the vehicle M passes through a target trajectory generated by the action plan generator 123 at a scheduled time.

The traveling driving force output device 200 outputs a traveling driving force (torque) for traveling of a vehicle to a driving wheel. The traveling driving force output device 200 includes, for example, a combination of an internal combustion engine, an electric motor, a transmission, and the like, and an ECU for controlling these. The ECU controls the constituents described above according to information input from the automated driving controller 100 or information input from the driving operator 80.

The brake device 210 includes, for example, a brake caliper, a cylinder that transmits a hydraulic pressure to the brake caliper, an electric motor that generates the hydraulic pressure in the cylinder, and a brake ECU. The brake ECU controls the electric motor according to the information input from the automated driving controller 100 or the information input from the driving operator 80, and brake torque in accordance with a braking operation is output to each wheel. The brake device 210 may include a mechanism for transmitting a hydraulic pressure generated by an operation of a brake pedal included in the driving operator 80 to the cylinder through a master cylinder as a backup. Note that the brake device 210 is not limited to the constituent described above, and may also be an electronically controlled hydraulic pressure brake device that controls an actuator according to information input from the traveling controller 141 and transmits a hydraulic pressure of the master cylinder to the cylinder.

The steering device 220 includes, for example, a steering ECU and an electric motor. The electric motor, for example, changes a direction of the steering wheel by applying a force to a rack and pinion mechanism. The steering ECU drives the electric motor and changes the direction of the steering wheel according to the information input from the automated driving controller 100 or the information input from the driving operator 80.

[Modification Processing of Target Trajectory]

Hereinafter, processing of modifying the target trajectory generated by the action plan generator 123 on the basis of a surrounding object of the host vehicle or the like will be described.

Figure 4:
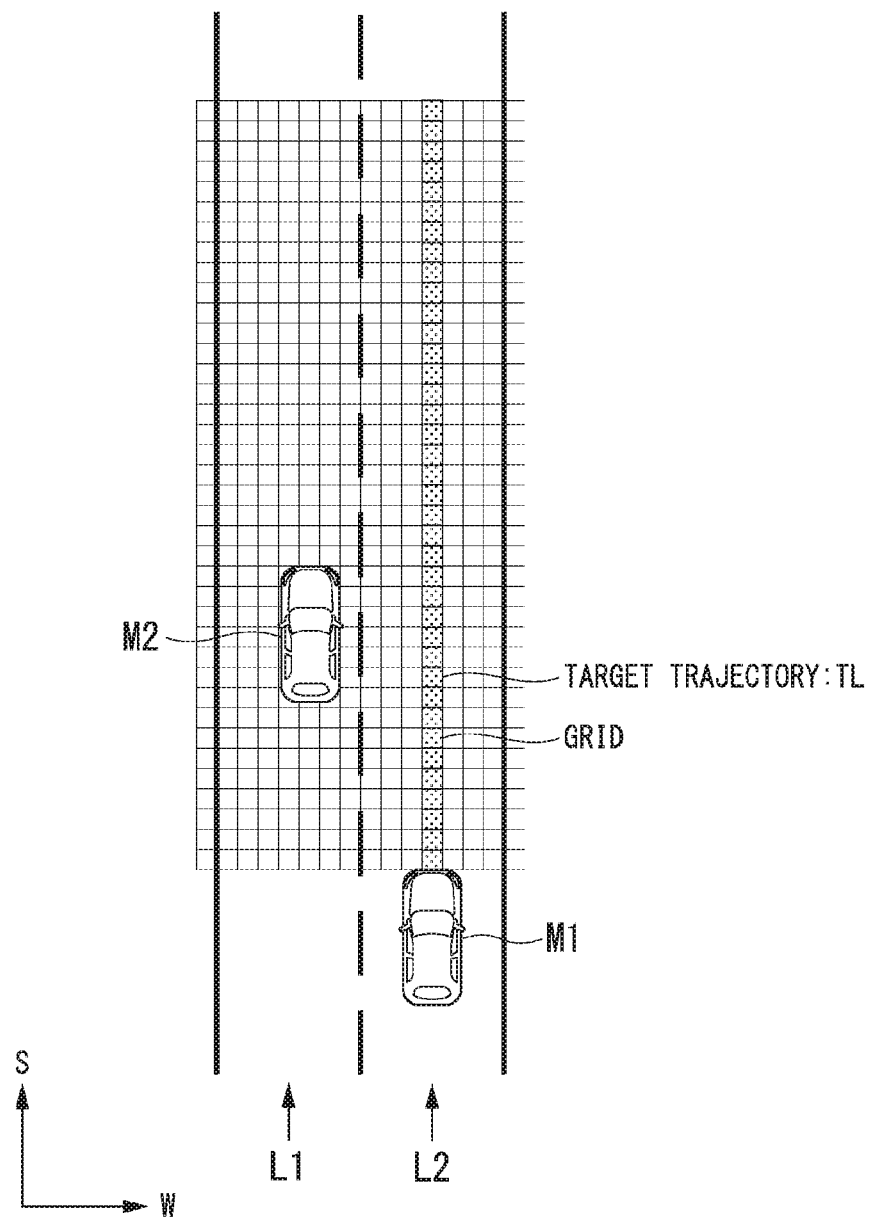
FIG. 4 is a diagram which describes an example of a target trajectory generation method.

FIG. 4 is a diagram which describes an example of a target trajectory generation method. The trajectory generator 123a of the action plan generator 123 first assumes a road surface area in a section in which the host vehicle M1 can travel in a coordinate system whose axes are in a direction along a longitudinal direction of the road (traveling direction) S and in a direction along a width direction of the road (lateral direction) W, and makes a grid obtained by virtually partitioning the road surface area into fixed widths in two directions. The division width of the grid may be set to be equal in the traveling direction and the lateral direction, and may be set to be different. In addition, a straight path is represented in FIG. 4 to simplify description, but it is possible to perform the same processing using any conversion processing also with regard to a curve.

The trajectory generator 123a selects one of grids arranged in a lateral direction for each set of coordinates with respect to a traveling direction S. The trajectory generator 123a selects, in principle, a grid at a central position in a width direction W of the lane L1 on which the host vehicle M1 travels. The trajectory generator 123a sets a selected grid group as a target trajectory. Note that grids may also be selected at every predetermined number in the traveling direction instead of this. In FIG. 4, a hatched grid corresponds to one target trajectory. This target trajectory is a trajectory through which a representative point of the host vehicle M (such as the center of gravity as described above) passes.

Figure 5:
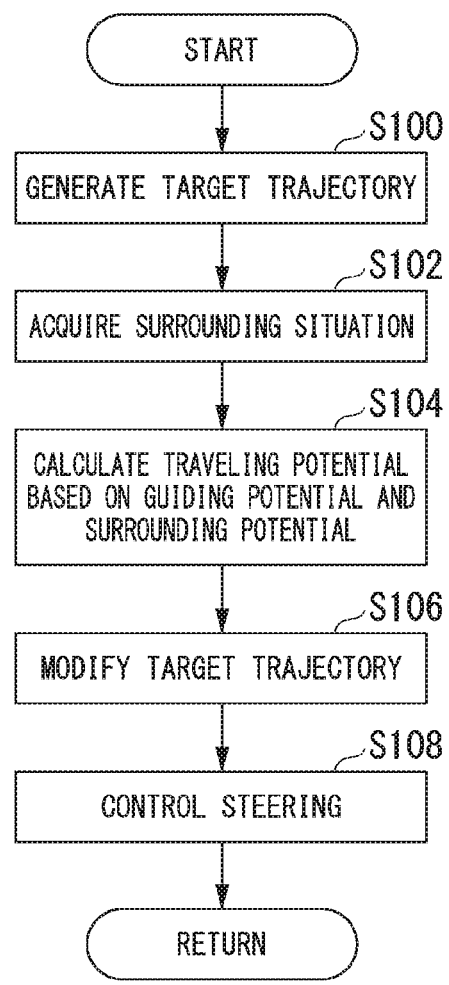
FIG. 5 is a flowchart which shows an example of processing of generating a target trajectory in an action plan generator.
Figure 6:
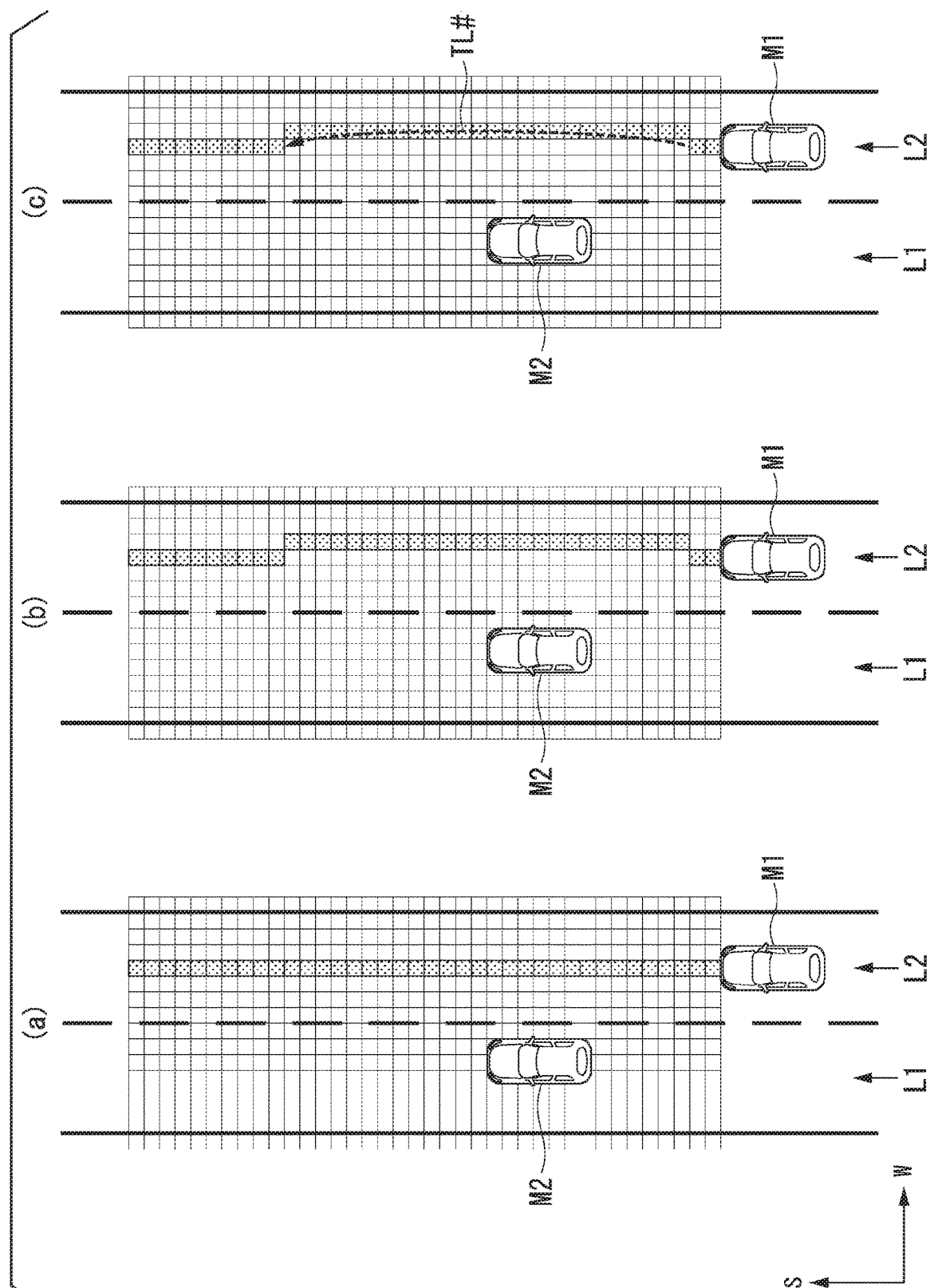
FIG. 6 is an explanatory diagram of processing of modifying a first target trajectory and generating a second target trajectory.

FIG. 5 is a flowchart which shows an example of the processing of generating a target trajectory in the action plan generator 123. FIG. 6 is an explanatory diagram of processing of modifying a first target trajectory and generating a second target trajectory. First, the action plan generator 123 generates a target trajectory using the trajectory generator 123a (step S100). As shown in FIG. 4, the trajectory generator 123a selects a grid at a central position in a width direction W among grids in the lane L1 on which the host vehicle M1 travels (FIG. 6(a)). Next, the action plan generator 123 acquires a surrounding situation on the basis of a result of the recognition of the external world recognizer 121 (step S102). The surrounding situation includes, for example, lanes L1 and L2, white lines drawn around the lanes, another vehicle M2, and side walls such as guardrails (not shown).

Next, the action plan generator 123 calculates a guiding potential (a first index value), a surrounding potential (a second index value), and a traveling potential (a third index value) (step S104). The first potential calculator 123b calculates a guiding potential which represents the safety of traveling along a generated target trajectory (a first target trajectory). In addition, the second potential calculator 123c calculates a surrounding potential which represents the safety based on a surrounding object of the host vehicle M1. Furthermore, the third potential calculator 123d calculates a traveling potential, which represents the safety when the host vehicle M1 is moved in the width direction W intersecting the traveling direction S of the host vehicle M1 at each point in an area in which the host vehicle M1 will be traveling in the future based on the first target trajectory, on the basis of the guiding potential and the surrounding potential.

Next, the trajectory generator 123a generates a modified target trajectory (a second target trajectory) by modifying the first target trajectory on the basis of a traveling potential (step S106). The trajectory generator 123a shifts the grid in a direction in which a distance to another vehicle M2 increases as shown in FIG. 6(b). In addition, the trajectory generator 123a calculates a target trajectory TL according to a spline function of the grid group. Note that the trajectory generator 123a may calculate a target trajectory not only by the spline function but also by a Hermite function. Next, the second controller 140 performs steering control of the host vehicle M1 on the basis of the second target trajectory (step S108).

[Interpolation Processing of Target Trajectory]

Figure 7:
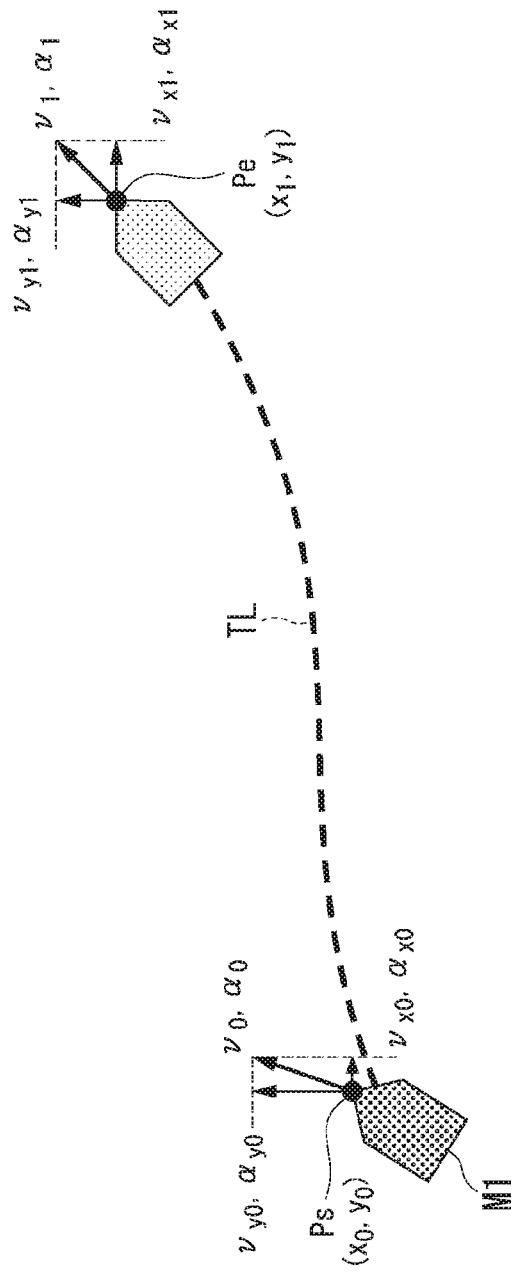
FIG. 7 is a diagram for calculation of a target trajectory TL by a trajectory generator.

FIG. 7 is an explanatory diagram for calculation of the target trajectory TL by a trajectory generator 123a. FIG. 7 represents a space in which the host vehicle M1 is present using XY coordinates. The trajectory generator 123a sets a launch position of a vector V as a start point Ps. The trajectory generator 123a calculates a curve that interpolates from the start point Ps to an end point Pe.

It is assumed that the speed of the host vehicle M is v0 and the acceleration is a0 at a start point Ps of coordinates (x0, y0). The speed v0 of the host vehicle M1 is a combination of an X direction component vx0 and a Y direction component vy0 of the speed. The acceleration a0 of the host vehicle M1 is a combination of an x direction component ax0 and a y direction component ay0 of the acceleration. The speed of the host vehicle M is set to v1 and the acceleration is set to a1 in coordinates (x1, y1) of the end point Pe. A speed v1 of the host vehicle M1 is a combination of an x direction component vx1 and a y direction component vy1 of the speed. An acceleration a1 of the host vehicle M1 is a combination of an x direction component ax1 and a y direction component ay1 of the acceleration.

The trajectory generator 123*a* sets a target point (x,y) at each time t in a period of an elapsed unit time T during which the host vehicle M1 reaches the end point Pe from the start point Ps. A computation equation of the target point (x,y) is expressed by the spline functions of the following Equation (1) and Equation (2).

$$x: f(t) = m5 \times t5 + m4 \times t4 + m3 \times t3 + (\tfrac{1}{2}) \times ax0 \times t2 + vx0 \times t + x0 \quad \text{Equation (1)}$$

$$y: f(t) = m5 \times t5 + m4 \times t4 + m3 \times t3 + (\tfrac{1}{2}) \times ay0 \times t2 + vy0 \times t + y0 \quad \text{Equation (2)}$$

In Equation (1) and Equation (2), m5, m4, and m3 are represented as in the following Equation (3), Equation (4), and Equation (5).

$$m5 = (20p0 - 20p1 + 12v0T + 8v1T + 3a0T2 - a1T2)/2T3 \quad \text{Equation (3)}$$

$$m4 = (30p0 - 30p1 + 16v0T + 14v1T + 3a0T2 - 2a1T2)/2T4 \quad \text{Equation (4)}$$

$$m3 = (12p0 - 12p1 + 6v0T + 6v1T + a0T2 - a1T2)/2T5 \quad \text{Equation (5)}$$

In Equation (3), Equation (4), and Equation (5), p0 is a position (x0,y0) of the host vehicle M1 at the start point Ps, and p1 is a position (x1,y1) of the host vehicle M1 at the end point Pe.

The trajectory generator 123*a* substitutes a value obtained by multiplying the vehicle speed acquired by the vehicle state acquirer 114 by a gain into vx0 and vy0 in Equation (1) and Equation (2), and acquires target point (x(t),y(t)) identified according to results of calculating the unit time T in Equation (1) and Equation (2) for each time t. As a result, a route calculator 115 obtains a spline curve obtained by interpolating the start point Ps and the end point Pe using a plurality of target points (x(t),y(t)). The trajectory generator 123*a* outputs the obtained spline curve as the target trajectory TL to the second controller 140 (step S110). Note that the trajectory generator 123*a* calculates a spline curve using a five-dimensional spline function, but there is no limitation to a five-dimensional spline function, and, as long as it is a high-dimensional spline function, a target route TL may be calculated by modifying Equation (1) to Equation (5).

[Processing of Calculating Potential]

Figure 8:
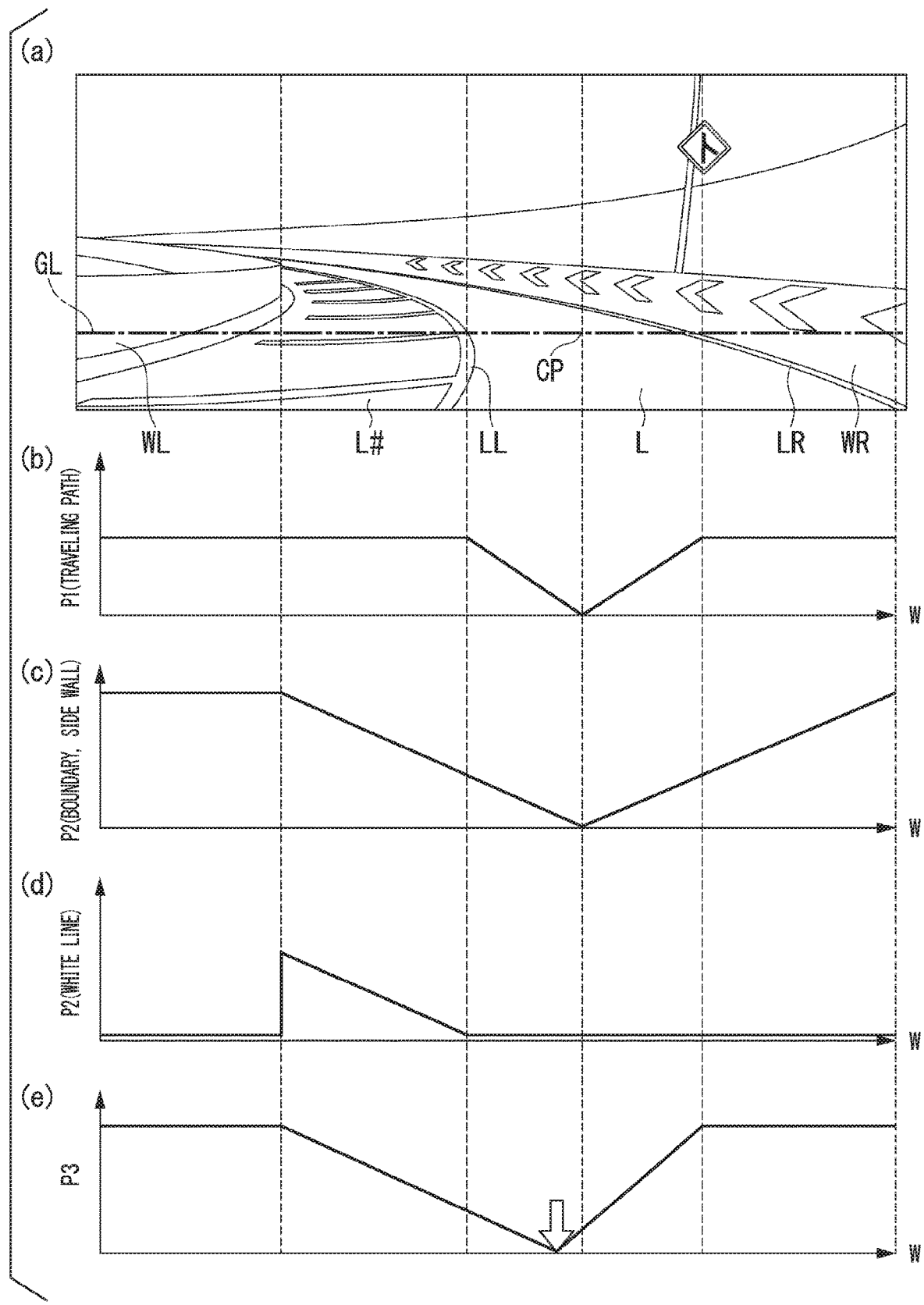
FIG. 8 is a diagram which shows an example of a trajectory potential, a surrounding potential, and a traveling potential.

FIG. 8 is a diagram which shows an example of a trajectory potential, a surrounding potential, and a traveling potential. As shown in FIG. 8(*a*), it is assumed that white lines LR and LL are drawn as road boundaries at both ends of a traveling path L in the width direction W, a curved road inner area L# is formed on a left side of the traveling path L, and furthermore side walls WR and WL are provided on a right side of the traveling path and a left side of the curved road inner area L#. FIGS. 8(*b*), 8(*c*), 8(*d*), and 8(*e*) are diagrams which represent a magnitude of a potential set for each grid on a grid line GL extending in the width direction W with respect to a predicted position in the traveling direction S at which the host vehicle M1 will be traveling in the future.

As shown in FIG. 8(*b*), the first potential calculator 123*b* calculates an guiding potential of a grid corresponding to a central position CP of the traveling path L in the width direction W as a minimum value. The first potential calculator 123*b* calculates an guiding potential which gradually increases as it goes away from the central position CP of the traveling path L in the width direction W. The first potential calculator 123*b* calculates the guiding potential of a grid corresponding to the white lines LL and LR as a maximum value.

As shown in FIG. 8(*c*), the second potential calculator 123*c* calculates a surrounding potential (P2) of a grid corresponding to the central position of the traveling path L in the width direction W as a minimum value. The second potential calculator 123*c* calculates a surrounding potential which gradually increases as it goes away from the central position of the traveling path L in the width direction W. The second potential calculator 123*c* calculates the surrounding potential of grids corresponding to the side walls WR and WL as a maximum value. Furthermore, the second potential calculator 123*c* calculates a surrounding potential of a grid corresponding to the curved road inner area L# as shown in FIG. 8(*d*). The second potential calculator 123*c* calculates the surrounding potential of a grid corresponding to the white line LL as a minimum value. The second potential calculator 123*c* calculates a surrounding potential which gradually increases as it goes away from the white line LL to the side wall WL.

Here, it is assumed that values of the guiding potential and the surrounding potential decrease as a degree of safety gets higher, and they increase as a degree of risk gets higher. That is, the second potential calculator 123*c* calculates the maximum value of the surrounding potential of the grids corresponding to the side walls WR and WL to be higher than the maximum value of the surrounding potential of the grid corresponding to the curved road inner road L#. Moreover, the first potential calculator 123*b* calculates an guiding potential in an area outside of the traveling path L to be lower than the surrounding potential.

The third potential calculator 123*d* calculates a value obtained by adding the guiding potential to the surrounding potential as a traveling potential. The third potential calculator 123*d* calculates the traveling potential of a grid shifted from the central position CP of the traveling path L to the white line LL side as a minimum value as shown in FIG. 8(*e*). The trajectory generator 123*a* modifies a target trajectory in order to travel to a position corresponding to a grid with a minimum traveling potential value.

The first potential calculator 123*b*, the second potential calculator 123*c*, and the third potential calculator 123*d* set a guiding potential at a point corresponding to the first target trajectory to a minimum value with a highest safety, and calculate a guiding potential which gradually increases from a minimum value as a point becomes further away from the point at which the guiding potential of the minimum value is set. Specifically, as shown in FIGS. 8(*b*) to 8(*e*), the first potential calculator 123*b*, the second potential calculator 123*c*, and the third potential calculator 123*d* change the potential from the minimum value to the maximum value with a linear gradient in the width direction W of the traveling path L. As a result, when a traveling position of the host vehicle M1 is shifted from the minimum value, the action plan generator 123 adjusts the speed until the position of the host vehicle M1 moves toward the minimum value.

The second potential calculator 123*c* may calculate a surrounding potential on the basis of position information of a surrounding object present in a blind area of a detector such as the camera 10 in an area in which the host vehicle M1 can travel. The second potential calculator 123*c* acquires the surrounding object included in a blind area with reference to the second map information 62 using a surrounding object acquirer 123e. For example, as shown in FIG. 8(a), the surrounding object acquirer 123e acquires a position of the surrounding object in the traveling path L ahead of a curved road. The second potential calculator 123c calculates the surrounding potential on the basis of the acquired position information of the surrounding object.

Figure 9:
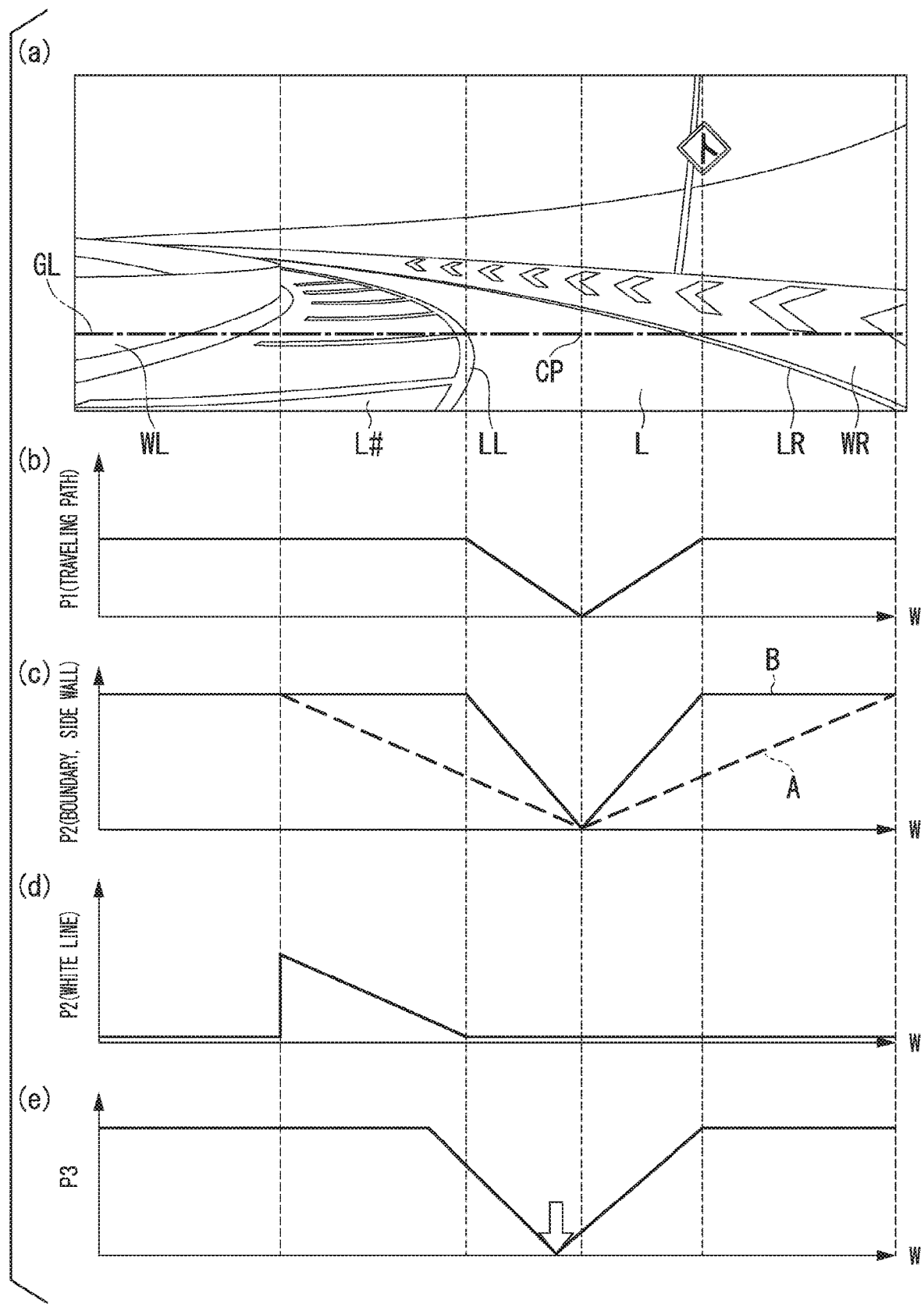
FIG. 9 is a diagram which shows another example of the trajectory potential, the surrounding potential, and the traveling potential.

The first potential calculator 123b, the second potential calculator 123c, and the third potential calculator 123d may change a potential in the width direction W on the basis of at least one of a condition designated by an occupant of the host vehicle M1, a type of the surrounding object, and a traveling history of the host vehicle M1. FIG. 9 is a diagram which shows another example of the trajectory potential, the surrounding potential, and the traveling potential. For example, it is assumed that, by the HMI 30, traveling with an emphasis on a sense of security is selected as the condition designated by the occupant of the host vehicle M1. In this case, as shown in FIG. 9(c), the first potential calculator 123b can change a surrounding potential which changes smoothly from a minimum value to a maximum value in the width direction W as shown in A in FIG. 9(c) to a surrounding potential which changes sharply from the minimum value to the maximum value in the width direction W as shown in B in FIG. 9(c). The first potential calculator 123b calculates a surrounding potential which changes smoothly from the minimum value to the maximum value in the width direction W as shown in A in FIG. 9(c) when another vehicle M2 traveling on a lane adjacent to a lane on which the host vehicle M1 travels is a normal car. On the other hand, the first potential calculator 123b can change the surrounding potential to a surrounding potential which changes sharply from the minimum value to the maximum value in the width direction W as shown in B in FIG. 9(c) when the another vehicle M2 is a large-sized vehicle such as a cargo truck. The first potential calculator 123b calculates a surrounding potential which changes smoothly from the minimum value to the maximum value in the width direction W as shown in A in FIG. 9(c) when the occupant of the host vehicle M1 prefers to travel to an end of the traveling path L on a curved road on the basis of the traveling history of the host vehicle M1. On the other hand, the first potential calculator 123b can change the surrounding potential to a surrounding potential which changes sharply from the minimum value to the maximum value in the width direction W as shown in B in FIG. 9(c) when the occupant of the host vehicle M1 prefers to travel toward a center in an oblique line.

The second potential calculator 123c may calculate a surrounding potential on the basis of the position information of a surrounding object present in a blind area of the detector such as the camera 10 in the area in which the host vehicle M1 can travel. The second potential calculator 123c refers to the second map information 62, and acquires the surrounding object included in the blind area using the surrounding object acquirer 123e. As shown in FIG. 8(a), the surrounding object acquirer 123e acquires, for example, the position of the surrounding object in the traveling path L ahead of the curved road. The second potential calculator 123c calculates a surrounding potential on the basis of the acquired position information of the surrounding object.

Figure 10:
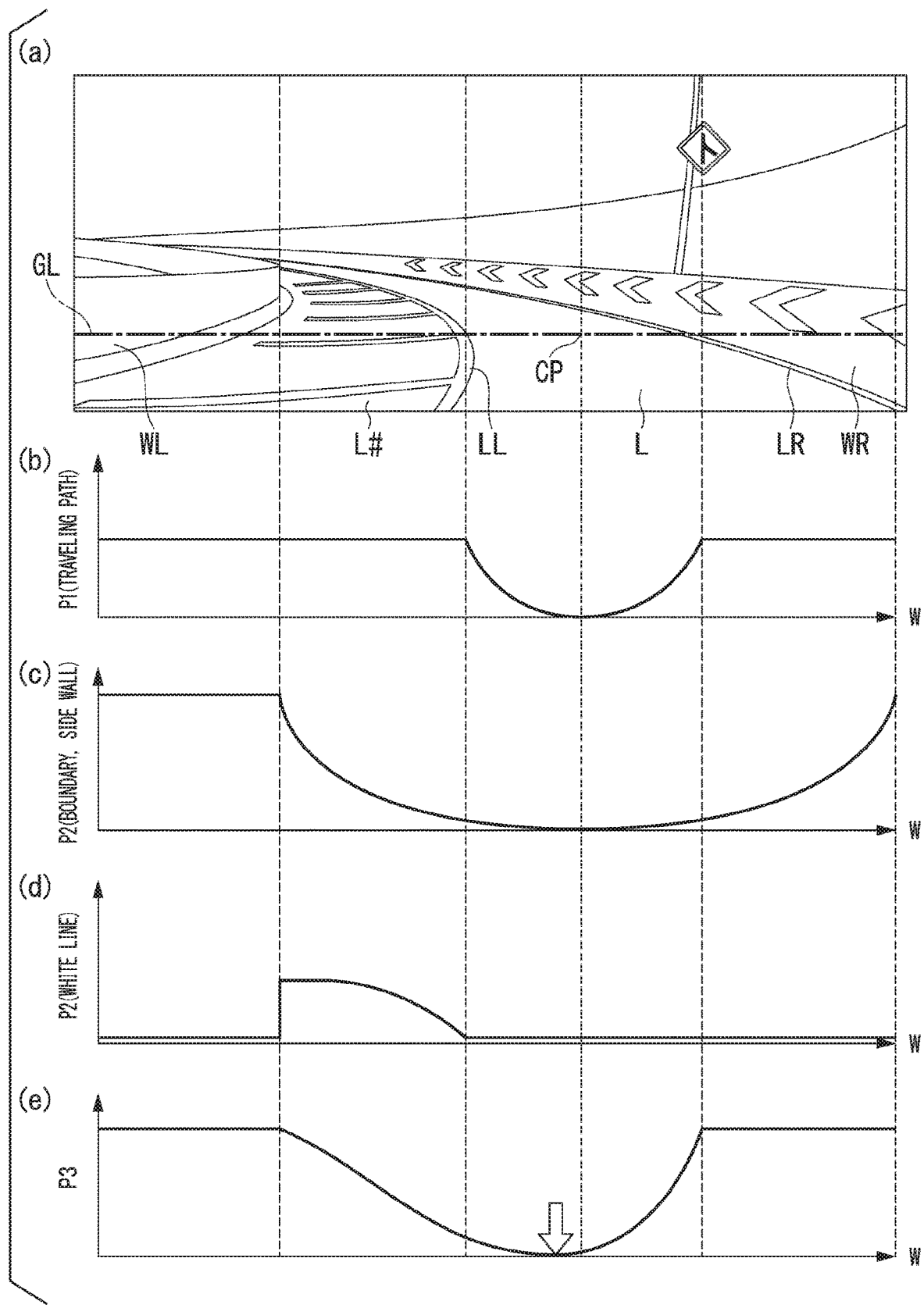
FIG. 10 is a diagram which shows another example of the trajectory potential, the surrounding potential, and the traveling potential.

FIG. 10 is a diagram which shows another example of the trajectory potential, the surrounding potential, and the traveling potential. As shown in FIG. 10(a), it is assumed that the white lines LR and LL as road boundaries are drawn at both ends of the traveling path L in the width direction W, the curved road inner area L# is formed at a left side of the traveling path L, and furthermore the side walls WR and WL are provided at a right side of the traveling path L and a left side of the curved road inner area L#. FIGS. 10(b), 10(c), 10(d), and 10(e) are diagrams which represent the magnitude of a potential set for each grid on the grid line GL extending in the width direction W with respect to a predicted position in the traveling direction S at which the host vehicle M1 will be traveling in the future.

The first potential calculator 123b calculates the guiding potential of a grid corresponding to the central position CP of the traveling path L in the width direction W as a minimum value as shown in FIG. 10(b). The first potential calculator 123b calculates the guiding potential which increases to rise sharply in the vicinity of the maximum value.

The second potential calculator 123c calculates a surrounding potential (P2) of a grid corresponding to the central position of the traveling path L in the width direction W as the minimum value as shown in FIG. 10(c). The second potential calculator 123c calculates the surrounding potential which increases to rise sharply in the vicinity of the maximum value. Furthermore, as shown in FIG. 9(d), the second potential calculator 123c calculates the surrounding potential of the grid corresponding to the curved road inner area L#. The second potential calculator 123c calculates the surrounding potential of the grid corresponding to the white line LL as the minimum value. The second potential calculator 123c calculates the surrounding potential which increases to rise sharply in the vicinity of the maximum value as it goes further away from the white line LL to the side wall WL.

The third potential calculator 123d calculates a value obtained by adding the guiding potential to the surrounding potential as a traveling potential. The third potential calculator 123d calculates the traveling potential of a grid shifted from the central position CP of the traveling path L to the white line LL side as a minimum value as shown in FIG. 10(e). The trajectory generator 123a modifies a target trajectory such that the traveling potential travels a position corresponding to the grid of the minimum value.

Figure 11:
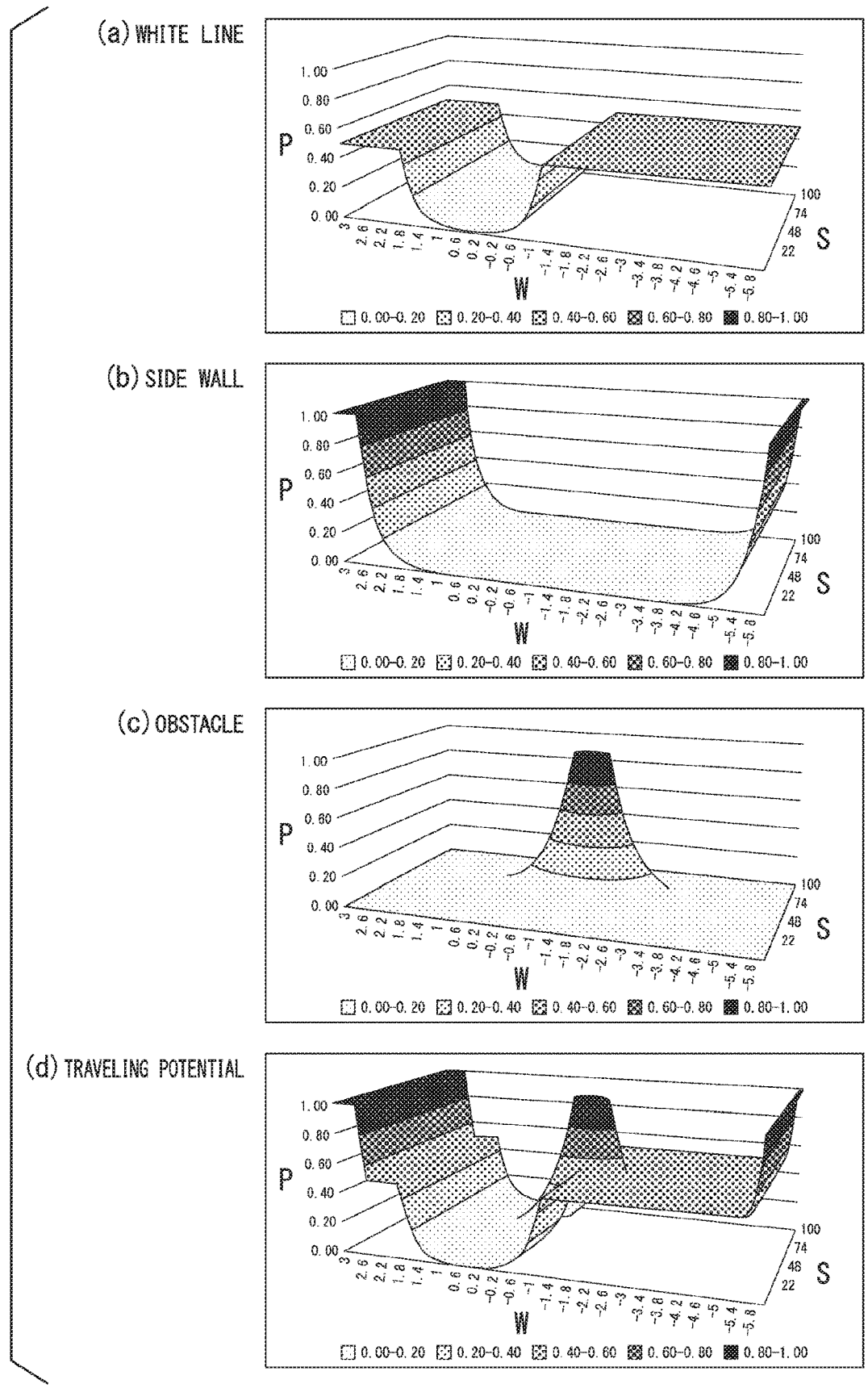
FIG. 11 is a diagram which shows an example of the surrounding potential.

FIG. 11 is a diagram which shows an example of the surrounding potential. FIG. 11 is a diagram which represents a current position of the host vehicle M1 in the width direction W and the traveling direction S as 0 (reference), and represents the surrounding potential (P) in a range of from the maximum value "1" to the minimum value "0." Numbers in the traveling direction S correspond to the number of grids aligned in the traveling direction S in which the host vehicle M1 will be traveling in the future. The second potential calculator 123c calculates the surrounding potential shown in FIG. 11(a), FIG. 11(b), and FIG. 11(c) when an obstacle such as a while line, a side wall, or the another vehicle M2 is present as a surrounding object.

The second potential calculator 123c predicts a future acceleration or deceleration speed of the host vehicle M1 and an acceleration or deceleration speed of another vehicle M2 in the vicinity of the host vehicle M1. The second potential calculator 123c calculates a surrounding potential corresponding to a point through which the host vehicle M1 will be traveling in the future on the basis of a relative position between the host vehicle M1 and the another vehicle M2 based on the future acceleration of the host vehicle M1 or deceleration speed of the host vehicle M1 and the acceleration or deceleration speed of another vehicle M2, which are predicted.

Figure 12:
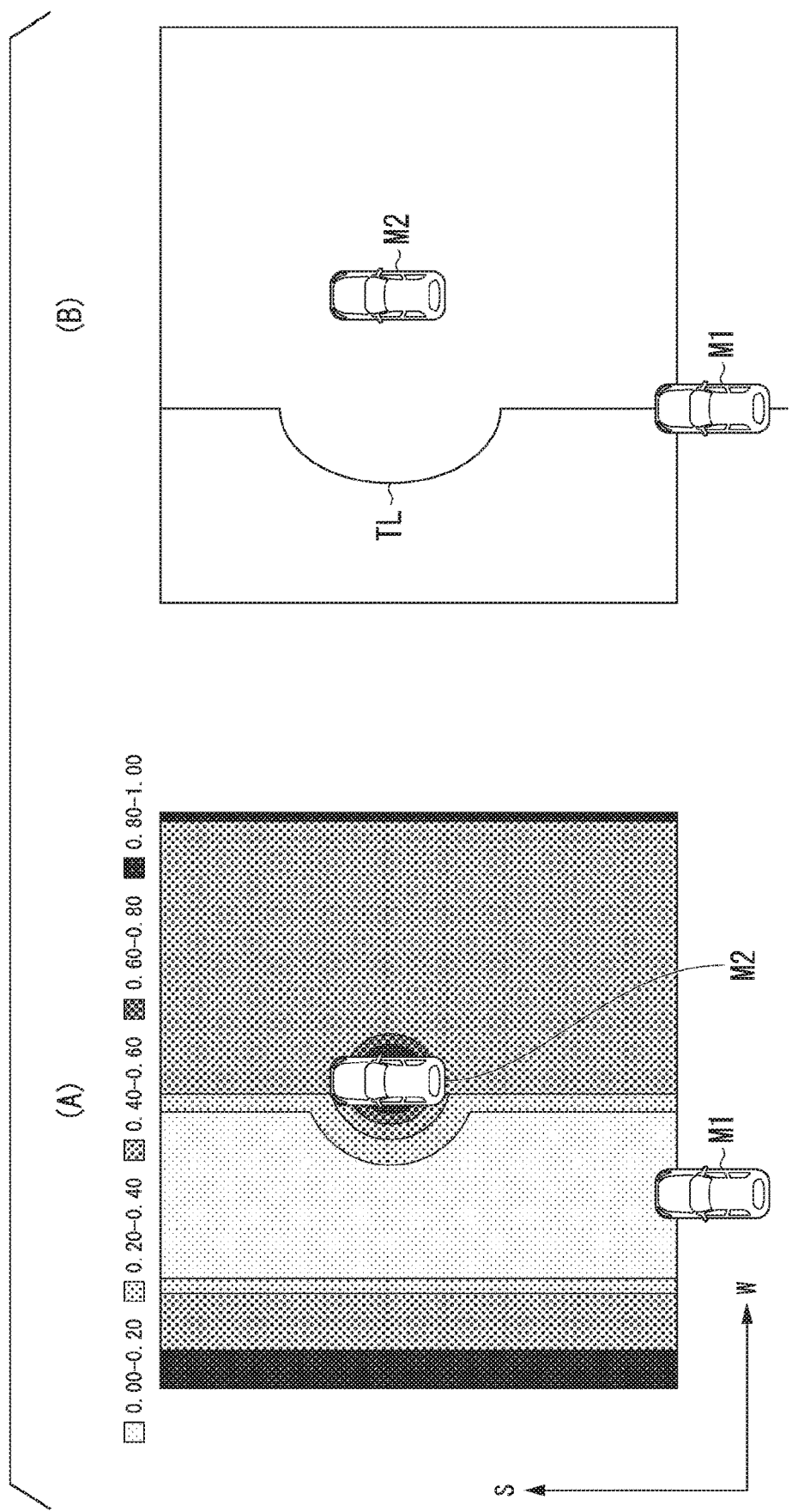
FIG. 12 is a diagram which represents a surrounding potential and modified target trajectory TL when another vehicle M2 is stopped.

FIG. 12 is a diagram which represents a surrounding potential and a modified target trajectory TL when the another vehicle M2 stops. As shown in FIG. 12(A), the first potential calculator 123b calculates the surrounding potential of a grid corresponding to an existence position of the another vehicle M2 as the maximum value when it is predicted that there is the another vehicle M2 stopping ahead of the host vehicle M1, and gradually decreases the surrounding potential as it goes away from the grid which is set as a center. When the surrounding potential is calculated as shown in FIG. 12 (A), the trajectory generator 123a modifies the target trajectory TL to be away from the another vehicle M2 in the width direction W from a position of the another vehicle M2, and furthermore modifies the target trajectory TL to return to a position before the modification in the width direction W after passing through the position of the another vehicle M2 in the traveling direction S as shown in FIG. 12 (B).

Figure 13:
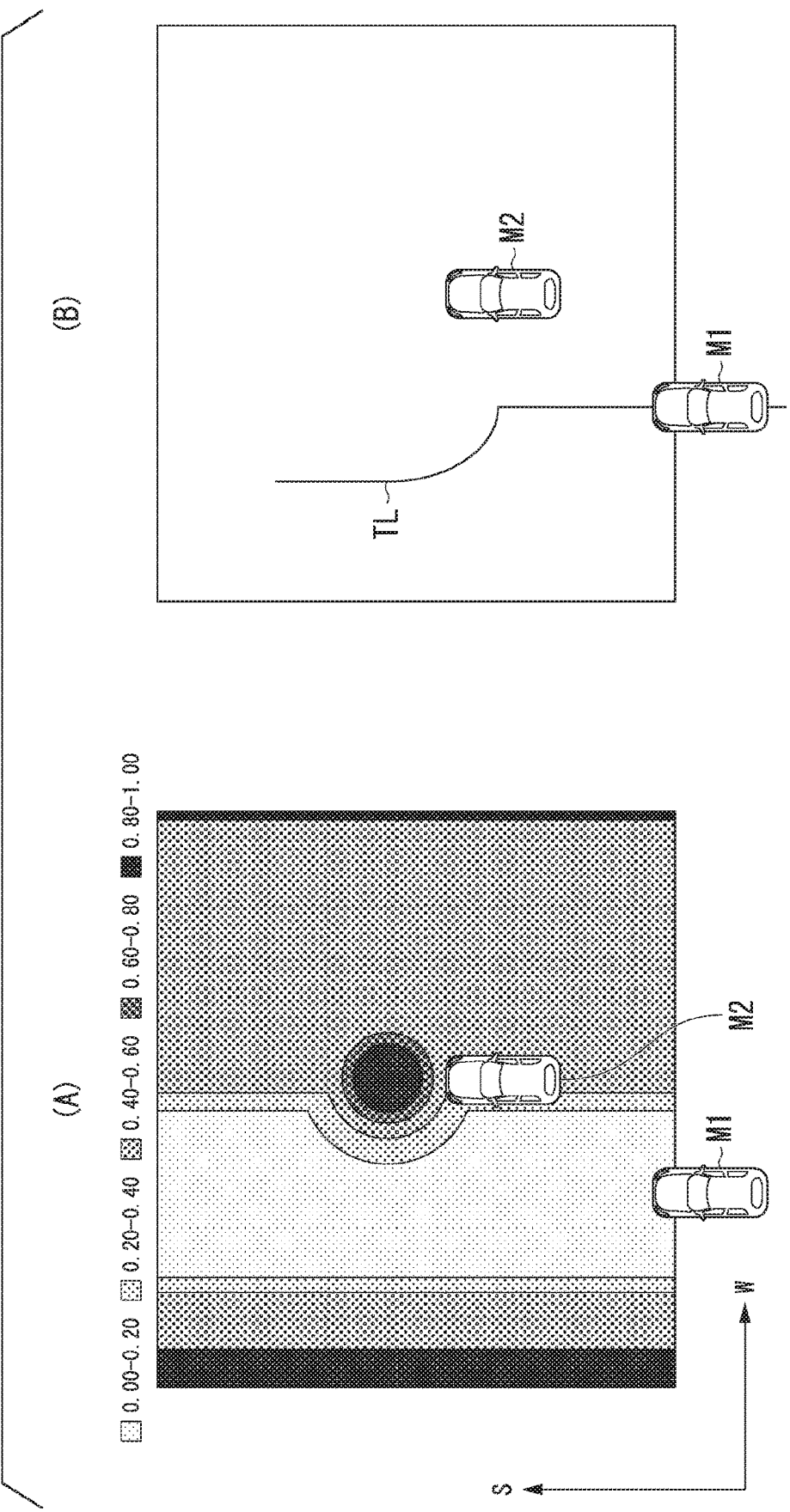
FIG. 13 is a diagram which represents a surrounding potential and modified target trajectory TL when another vehicle M2 travels at a lower speed than that of a host vehicle M1.

FIG. 13 is a diagram which represents the surrounding potential and the modified target trajectory TL when the another vehicle M2 travels at a lower speed than that of the host vehicle M1. As shown in FIG. 13(A), when it is predicted that at the front of the host vehicle M1, there is another vehicle M2 with a lower speed than that of the host vehicle M1, the first potential calculator 123b calculates the surrounding potential of a grid corresponding to a front of the existence position of the another vehicle M2 as the maximum value, and gradually decreases the surrounding potential as it goes away from the grid which is set as a center. When the surrounding potential is calculated as shown in FIG. 13(A), the trajectory generator 123a modifies the target trajectory TL to be away from the another vehicle M2 in the width direction W, and furthermore modifies the target trajectory TL to maintain a distance from the another vehicle M2 in the width direction W as shown in FIG. 13 (B).

Figure 14:
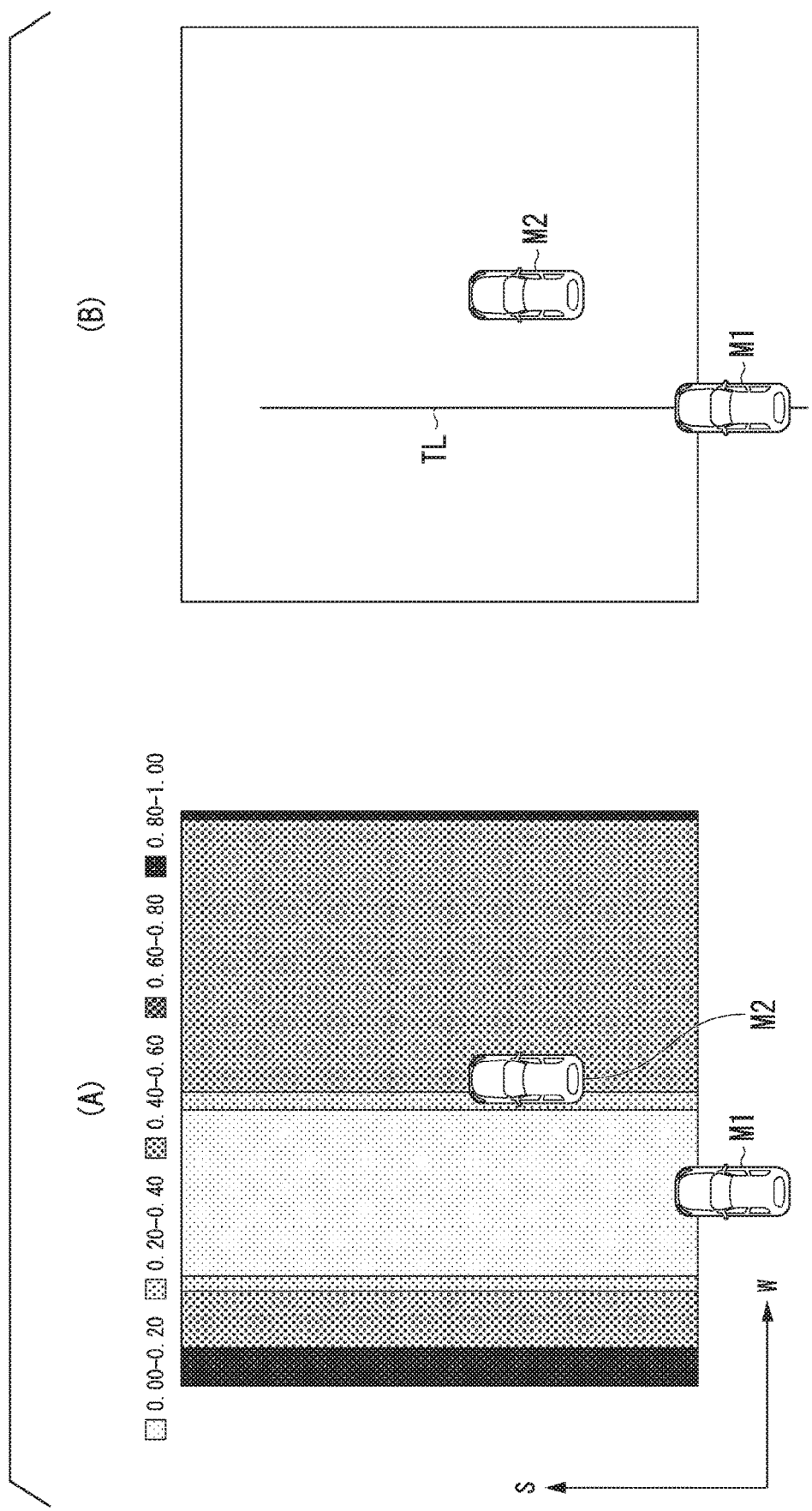
FIG. 14 is a diagram which represents a surrounding potential and modified target trajectory TL when another vehicle M2 travels at the same speed as that of the host vehicle M1.

FIG. 14 is a diagram which represents a surrounding potential and a modified target trajectory TL when another vehicle M2 travels at the same speed as that of the host vehicle M1. When it is predicted that there is another vehicle M2 traveling at the same speed as that of the host vehicle M1 at the front of the host vehicle M1 as shown in FIG. 14(A), the first potential calculator 123b sets the position of the another vehicle M2 as a center, and does not change the surrounding potential in the vicinity of the position of the another vehicle M2 according to a presence of the another vehicle M2. Note that, even if it is predicted that there is another vehicle eM2 traveling at a higher speed than that of the host vehicle M1 at the front of the host vehicle M1, the first potential calculator 123b sets the position of the another vehicle M2 as a center, and does not change the surrounding potential in the vicinity of the position of the another vehicle M2 according to the presence of the another vehicle M2.

Figure 15:
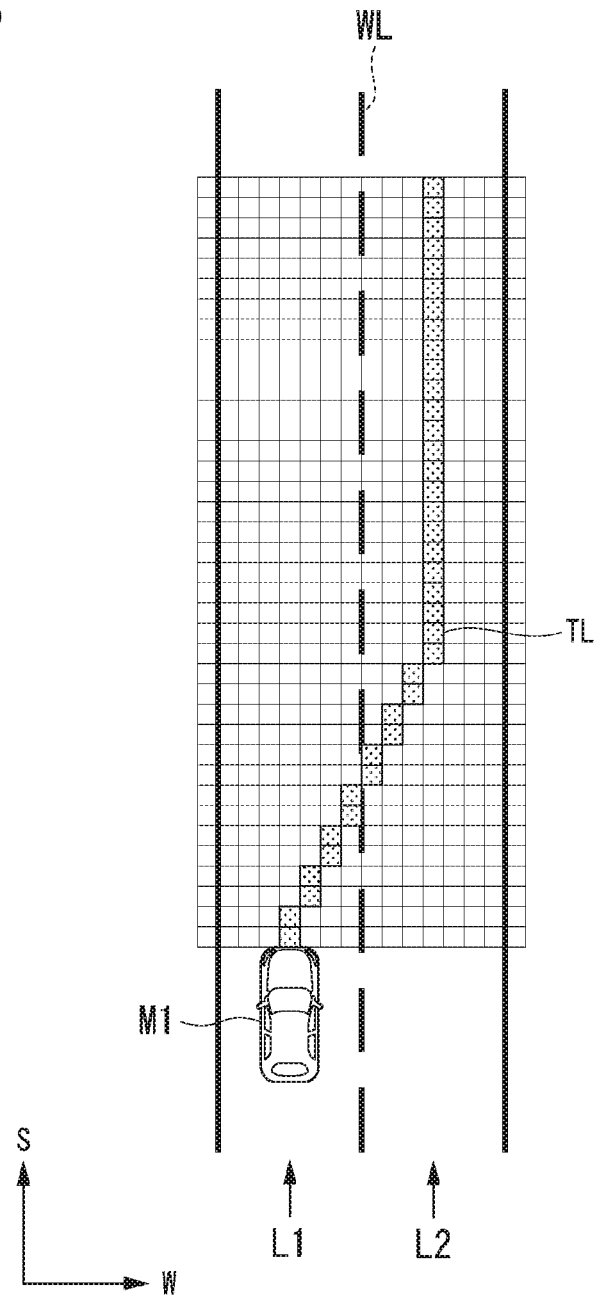
FIG. 15 is a diagram which shows an example of a target trajectory when the host vehicle M1 changes lanes.
Figure 16:
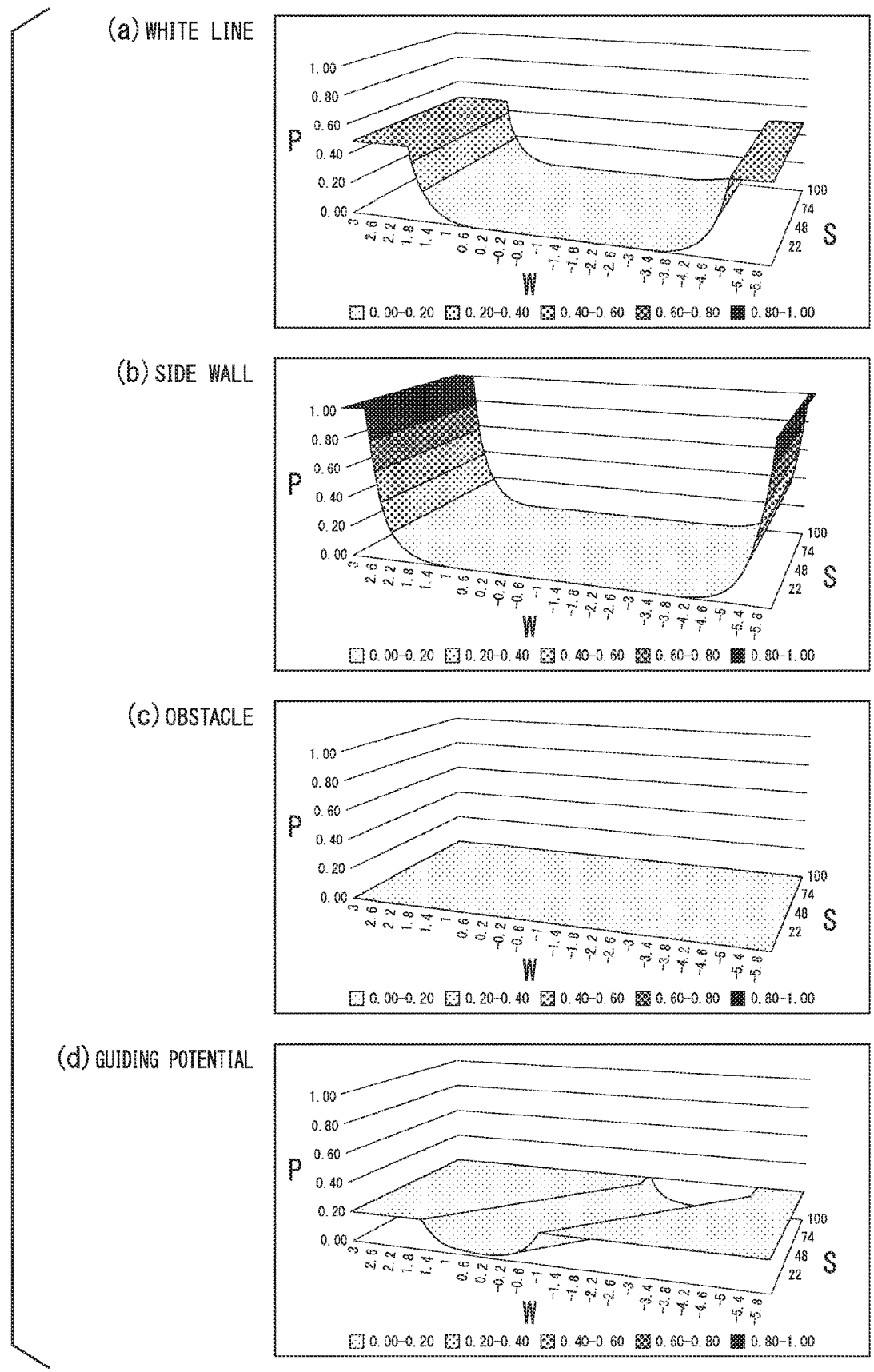
FIG. 16 is a diagram which shows an example of a surrounding potential based on a white line, a surrounding potential based on a side wall, a surrounding potential based on an obstacle, and an guiding potential.

FIG. 15 is a diagram which shows an example of a target trajectory when the host vehicle M1 changes lanes. The trajectory generator 123a selects a group of grids that enter obliquely from a lane L1 to L2 as shown in FIG. 15 when a lane is changed from the lane L1 to L2. The second potential calculator 123c, for example, ignores the while line WL representing a boundary between the lane L1 and L2 and calculates a surrounding potential as shown in FIGS. 16(a), 16(b), and 16(c) when an operation to change lanes is received. FIG. 16 is a diagram which shows an example of a surrounding potential based on a white line, a surrounding potential based on a side wall, a surrounding potential based on an obstacle, and an guiding potential. In addition, the first potential calculator 123b calculates an guiding potential of a grid selected by the trajectory generator 123a as the minimum value as shown in FIG. 16(d). The first potential calculator 123b calculates the guiding potential such that the value gradually increases as a grid becomes further away from the grid selected by the trajectory generator 123a.

Figure 17:
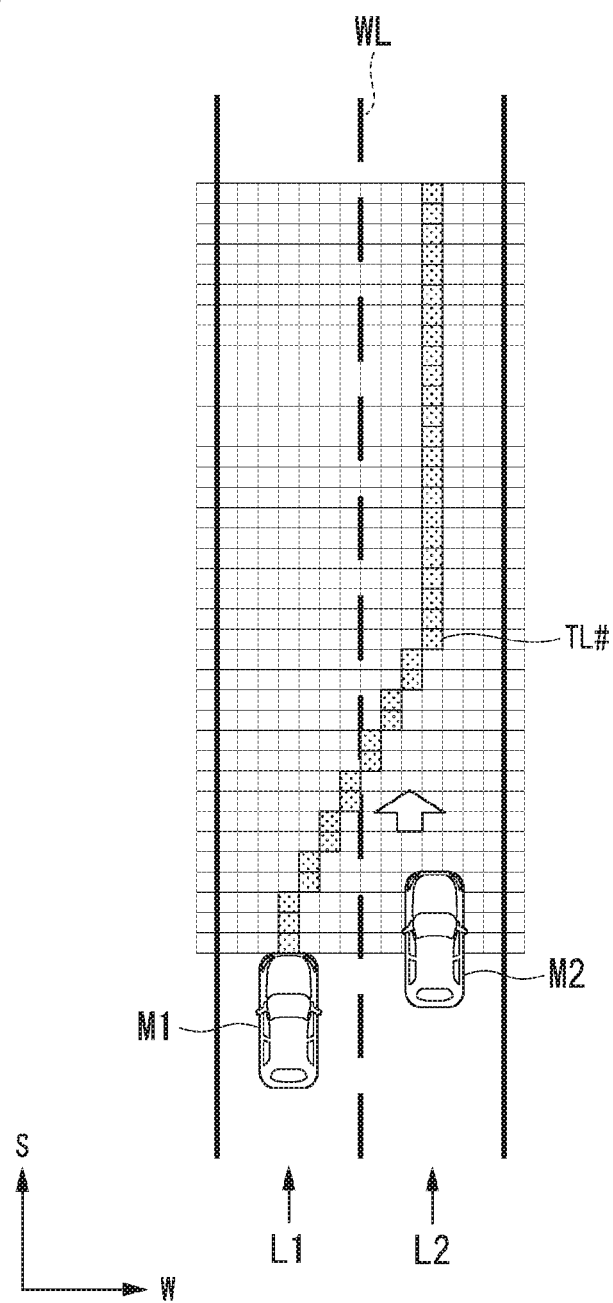
FIG. 17 is a diagram which represents the target trajectory TL in a case in which there is another vehicle M2 when the host vehicle M1 changes lanes.
Figure 18:
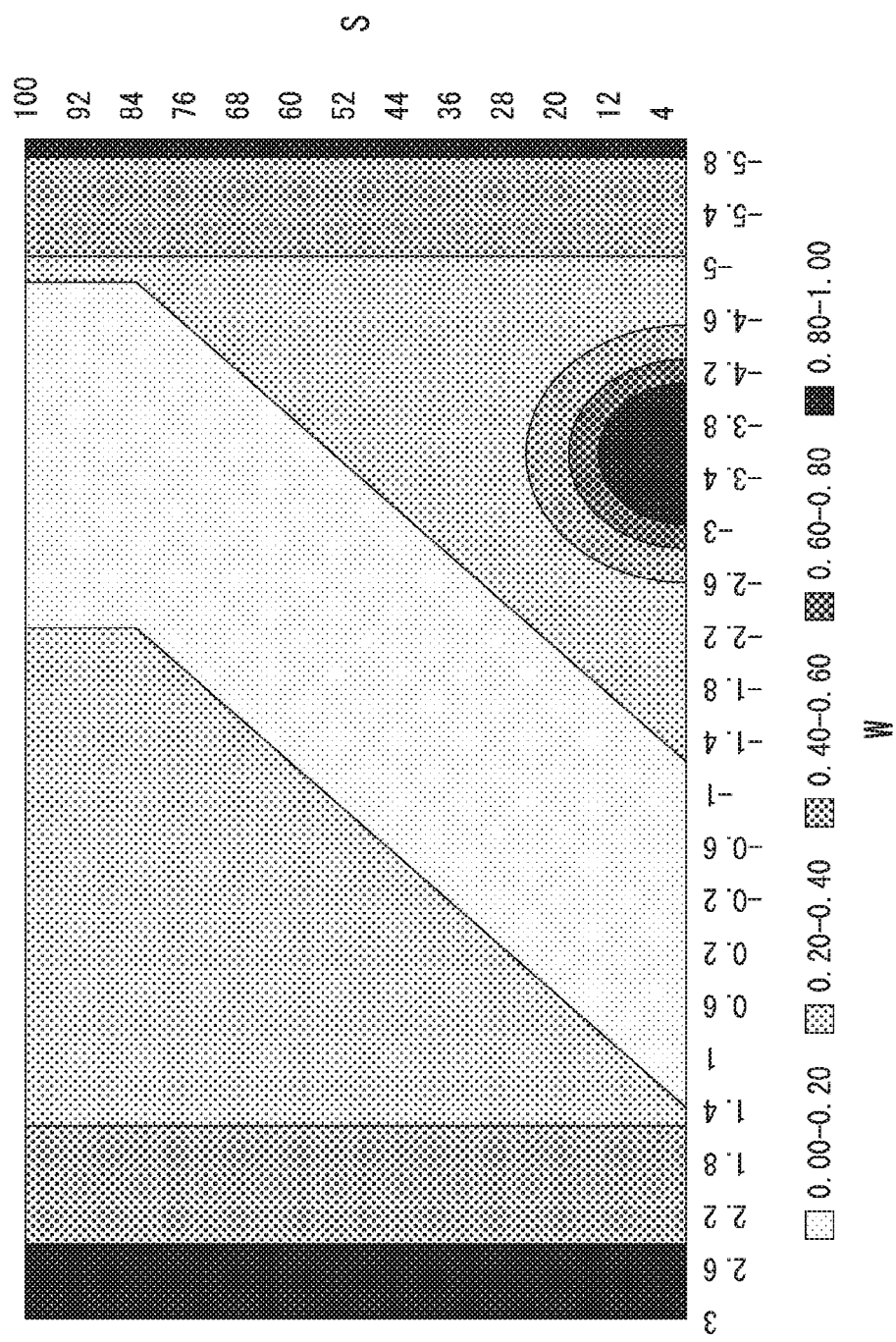
FIG. 18 is a diagram which represents a traveling potential in a case in which there is another vehicle M2 when the host vehicle M1 changes lanes.

FIG. 17 is a diagram which represents the target trajectory TL in a case in which there is another vehicle M2 when the host vehicle M1 changes lanes. FIG. 18 is a diagram which represents a traveling potential in a case in which there is another vehicle M2 when the host vehicle M1 changes lanes. When the host vehicle M1 changes lanes, in a case in which there is another vehicle M2 in the lane L2, the trajectory generator 123a modifies the target trajectory in a direction of being away from the another vehicle M2.

Figure 19:
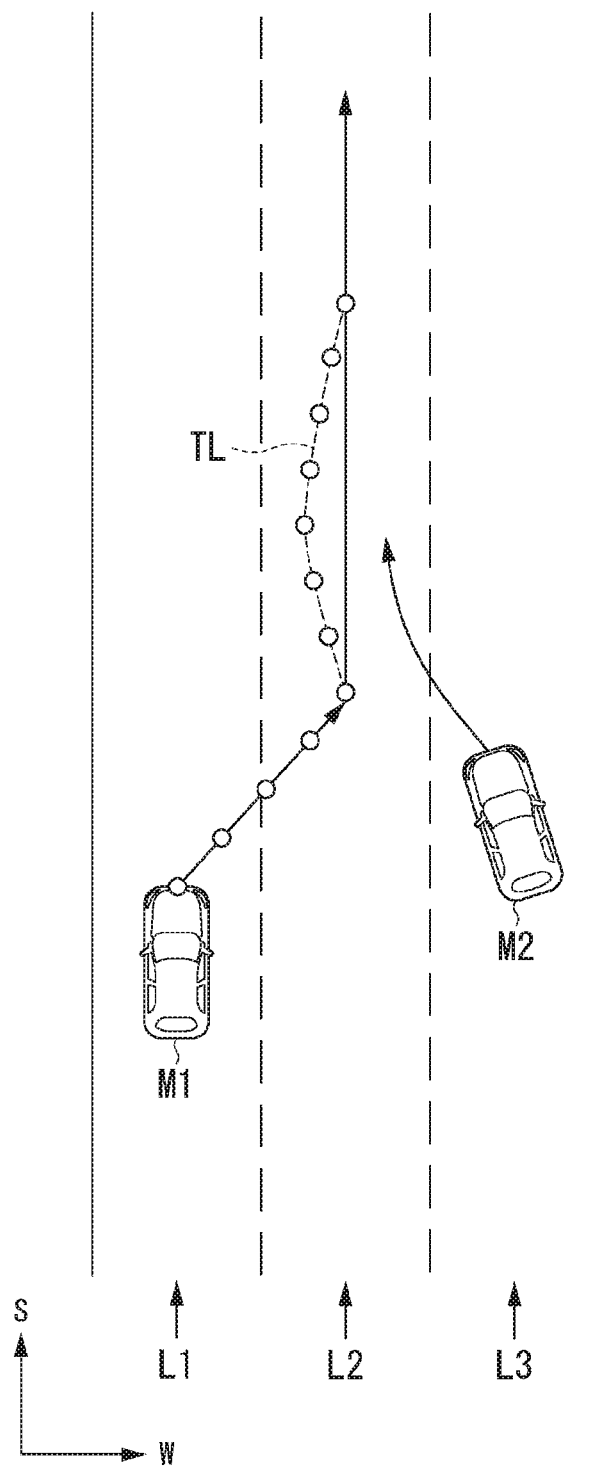
FIG. 19 is another diagram which represents the target trajectory TL in a case in which there is another vehicle M2 when the host vehicle M1 changes lanes.

FIG. 19 is another diagram which represents the target trajectory TL in a case in which there is another vehicle M2 when the host vehicle M1 changes lanes. When the host vehicle M1 changes lanes from the lane L1 to L2, and the another vehicle M2 changes lanes from a lane L3 to the L2, the trajectory generator 123a calculates the target trajectory TL obtained by shifting a target trajectory of the host vehicle M1 from a central position of the lane L2 in a direction of being away from the another vehicle M2.

According to the vehicle control system 1 described above, the vehicle control system 1 includes the first potential calculator 123b which calculates an guiding potential representing safety of traveling along a first target trajectory, the second potential calculator 123c which calculates a surrounding potential representing safety based on a surrounding object of a host vehicle, the third potential calculator 123d which calculates a traveling potential representing safety when a host vehicle is moved in a direction intersecting a traveling direction of the host vehicle at each point included in an area in which the host vehicle will be traveling in the future with the first target trajectory as a reference on the basis of an guiding potential calculated by the first potential calculator 123b and a surrounding potential calculated by the second potential calculator 123c, and a second controller 140 which performs traveling control of the host vehicle on the basis of a second target trajectory obtained by modifying the first target trajectory on the basis of a traveling potential calculated by the third potential calculator 123d. According to the vehicle control system 1, since the position of the vehicle M in the width direction W can be adjusted on the basis of the surrounding potential in addition to the guiding potential, it is possible to suppress a sense of insecurity given to an occupant of the vehicle according to a situation around the host vehicle.

In addition, according to the vehicle control system 1, since the guiding potential is calculated on the basis of a position of a side wall provided in a traveling path and a position of a white line drawn in the traveling path, it is possible to move the position of the host vehicle M1 in the width direction W on the basis of the positions of a side wall and a white line. As a result, according to the vehicle control system 1, it is possible to suppress the sense of insecurity given to the occupant of the vehicle according to situations of a white line and a side wall.

Furthermore, according to the vehicle control system 1, since the surrounding potential representing safety is calculated on the basis of a position of an obstacle and a position of a white line, it is possible to suppress the sense of insecurity given to the occupant of the vehicle according to the situations of a white line and a side wall.

Furthermore, according to the vehicle control system 1, since an guiding potential at a point corresponding to the first target trajectory is set to a highest safety value, and an guiding potential whose safety has gradually decreased from the highest safety value as a point becomes further away from the point at which the guiding potential having the highest safety value is set is calculated, when the host vehicle M1 travels from a white line to an outside of the traveling path L, it is possible to perform control such that the host vehicle M1 returns to the traveling path L.

Furthermore, according to the vehicle control system 1, since a surrounding potential at a point corresponding to a vicinity of an object other than a white line among surrounding objects is caused to sharply rise from the highest safety value, it is possible to suppress the sense of insecurity given to the occupant of the vehicle according to a situation such as a side wall except a white line.

Furthermore, according to the vehicle control system 1, since the future acceleration or deceleration speed of the host vehicle M1 and the acceleration or deceleration speed of another vehicle M2 in the vicinity of the host vehicle M1 are predicted, and a surrounding potential corresponding to a point at which the host vehicle M1 will be traveling in the future is calculated on the basis of a result of the prediction, it is possible to suppress the sense of insecurity given to the occupant of the vehicle according to a situation of the another vehicle M2.

Furthermore, according to the vehicle control system 1, since a gradient which changes a surrounding potential at a point corresponding to the vicinity of a surrounding object is changed according to a condition designated by the occupant of the host vehicle M1, a type of a surrounding object, the traveling history of the host vehicle M1, or the like, it is possible to control traveling of the host vehicle M1 in consideration of the condition designated by the occupant of the host vehicle M1, the type of a surrounding object, or the traveling history of the host vehicle M1.

Furthermore, according to the vehicle control system 1, since a surrounding potential is calculated on the basis of position information of a surrounding object present in a blind area among areas that the host vehicle M1 can travel, it is possible to suppress the sense of insecurity given to the occupant of the vehicle according to the surrounding object present in the blind area.

As described above, although aspects for carrying out the present invention have been described using the embodiments, the present invention is not limited to the embodiments in any way, and various modifications and substitutions can be made within a range not departing from the gist of the present invention.

What is claim is:

1. A vehicle control device comprising:
   a detector configured to detect a surrounding object of a host vehicle;
   a generator configured to generate a first target trajectory on the basis of a shape of a traveling path in which the host vehicle travels;
   a first potential calculater configured to calculate a first index value which represents safety of traveling along the first target trajectory;
   a second potential calculater configured to calculate a second index value which represents safety based on a surrounding object of the host vehicle;
   a third potential calculater configured to calculate a third index value, which represents safety when the host vehicle is moved in a direction intersecting a traveling direction of the host vehicle at each point included in an area in which the host vehicle will be traveling in the future based on the first target trajectory, on the basis of the first index value calculated by the first potential calculater and the second index value calculated by the second potential calculater; and
   a traveling controller configured to perform traveling control of the host vehicle on the basis of a second target trajectory obtained by modifying the first target trajectory on the basis of the third index value calculated by the third potential calculater,
   wherein the first potential calculater is configured to set the first index value at a point corresponding to the first target trajectory to a highest safety value, and calculates the first index value of a value indicating that the safety has gradually decreased from the value indicating that the safety is the highest as a point becomes further away from the point at which the first index value of a value indicating that the safety is the highest is set.

2. The vehicle control device according to claim 1, wherein the first potential calculater is configured to calculate the first index value on the basis of a position of a side wall provided in the traveling path and a position of a white line drawn in the traveling path.

3. The vehicle control device according to claim 1, wherein the surrounding object includes a position of an obstacle in a vicinity of the host vehicle and a position of a white line drawn in the traveling path, and the second potential calculater is configured to calculate the second index value representing a safety based on the position of an obstacle and the position of a white line.

4. The vehicle control device according to claim 1, wherein the second potential calculater is configured to change a gradient that changes the second index value at a point corresponding to a vicinity of the surrounding object on the basis of at least one of a condition designated by an occupant of the host vehicle, a type of the surrounding object, or a traveling history of the host vehicle.

5. The vehicle control device according to claim 1, further comprising:
   a surrounding object acquirer configured to acquire position information of a surrounding object present in a blind area of the detector in an area in which the host vehicle travels,
   wherein the second potential calculater is configured to calculate the second index value on the basis of the position information of a surrounding object acquired by the surrounding object acquirer.

6. A vehicle control method using a computer comprising:
   acquiring a situation outside a vehicle;
   detecting a surrounding object of a host vehicle;
   generating a first target trajectory on the basis of a shape of a traveling path in which the host vehicle travels;
   calculating a first index value which represents safety of traveling along the first target trajectory;
   calculating a second index value which represents safety based on a surrounding object of the host vehicle;
   calculating a third index value, which represents safety when the host vehicle is moved in a direction intersecting a traveling direction of the host vehicle at each point included in an area in which the host vehicle will be traveling in the future based on the first target trajectory, on the basis of the first index value and the second index value; and
   performing traveling control of the host vehicle on the basis of a second target trajectory obtained by modifying the first target trajectory on the basis of the third index value;

wherein the calculating the first index value comprises setting the first index value at a point corresponding to the first target trajectory to a highest safety value, and calculating the first index value of a value indicating that the safety has gradually decreased from the value indicating that the safety is the highest as a point becomes further away from the point at which the first index value of a value indicating that the safety is the highest is set.

7. A computer-readable non-transitory storage medium storing a vehicle control program which causes a computer to acquire a situation outside a vehicle;

detect a surrounding object of a host vehicle;

generate a first target trajectory on the basis of a shape of a traveling path in which the host vehicle travels;

calculate a first index value which represents safety of traveling along the first target trajectory;

calculate a second index value which represents safety based on a surrounding object of the host vehicle;

calculate a third index value, which represents safety when the host vehicle is moved in a direction intersecting a traveling direction of the host vehicle at each point included in an area in which the host vehicle will be traveling in the future based on the first target trajectory, on the basis of the first index value and the second index value; and perform traveling control of the host vehicle on the basis of a second target trajectory obtained by modifying the first target trajectory on the basis of the third index value;

wherein calculation of the first index value comprises setting the first index value at a point corresponding to the first target trajectory to a highest safety value, and calculating the first index value of a value indicating that the safety has gradually decreased from the value indicating that the safety is the highest as a point becomes further away from the point at which the first index value of a value indicating that the safety is the highest is set.

8. A vehicle control device comprising:

a detector configured to detect a surrounding object of a host vehicle;

a generator configured to generate a first target trajectory on the basis of a shape of a traveling path in which the host vehicle travels;

a first potential calculator configured to calculate a first index value which represents safety of traveling along the first target trajectory;

a second potential calculator configured to calculate a second index value which represents safety based on a surrounding object of the host vehicle;

a third potential calculator configured to calculate a third index value, which represents safety when the host vehicle is moved in a direction intersecting a traveling direction of the host vehicle at each point included in an area in which the host vehicle will be traveling in the future based on the first target trajectory, on the basis of the first index value calculated by the first potential calculator and the second index value calculated by the second potential calculator; and a traveling controller configured to perform traveling control of the host vehicle on the basis of a second target trajectory obtained by modifying the first target trajectory on the basis of the third index value calculated by the third potential calculator, wherein the second potential calculator is configured to calculate the first index value of a value indicating that the safety has gradually decreased from a value indicating that the safety is the highest as a point becomes further away from the point at which the first index value of a value indicating that the safety is the highest is set.

9. A vehicle control device comprising:

a detector configured to detect a surrounding object of a host vehicle;

a generator configured to generate a first target trajectory on the basis of a shape of a traveling path in which the host vehicle travels;

a first potential calculator configured to calculate a first index value which represents safety of traveling along the first target trajectory;

a second potential calculator configured to calculate a second index value which represents safety based on a surrounding object of the host vehicle;

a third potential calculator configured to calculate a third index value, which represents safety when the host vehicle is moved in a direction intersecting a traveling direction of the host vehicle at each point included in an area in which the host vehicle will be traveling in the future based on the first target trajectory, on the basis of the first index value calculated by the first potential calculator and the second index value calculated by the second potential calculator; and a traveling controller configured to perform traveling control of the host vehicle on the basis of a second target trajectory obtained by modifying the first target trajectory on the basis of the third index value calculated by the third potential calculator, wherein the second potential calculator is configured to change the second index value at a point corresponding to a vicinity of an object other than a white line among surrounding objects to a value with the safety having sharply decreased from the value with a highest safety.

10. A vehicle control device comprising:

a detector configured to detect a surrounding object of a host vehicle;

a generator configured to generate a first target trajectory on the basis of a shape of a traveling path in which the host vehicle travels;

a first potential calculator configured to calculate a first index value which represents safety of traveling along the first target trajectory;

a second potential calculator configured to calculate a second index value which represents safety based on a surrounding object of the host vehicle;

a third potential calculator configured to calculate a third index value, which represents safety when the host vehicle is moved in a direction intersecting a traveling direction of the host vehicle at each point included in an area in which the host vehicle will be traveling in the future based on the first target trajectory, on the basis of the first index value calculated by the first potential calculator and the second index value calculated by the second potential calculator; and a traveling controller configured to perform traveling control of the host vehicle on the basis of a second target trajectory obtained by modifying the first target trajectory on the basis of the third index value calculated by the third potential calculator, wherein the second potential calculator is configured to predict a future acceleration or deceleration speed of the host vehicle and an acceleration or deceleration speed of another vehicle in a vicinity of the host vehicle, and calculates the second index value corresponding to a point in which the host vehicle will be traveling in the future on the basis of a relative position between the host vehicle and the another vehicle based on the predicted future acceleration or deceleration speed of the host vehicle and the predicted acceleration or deceleration speed of another vehicle in the vicinity of the host vehicle.

\* \* \* \* \*